US012566821B2

(12) United States Patent
Tandon et al.

(10) Patent No.: US 12,566,821 B2
(45) Date of Patent: Mar. 3, 2026

(54) GENERATIVE SYSTEM FOR WRITING ENTITY RECOMMENDATIONS

(71) Applicant: Microsoft Technology Licensing, LLC, Redmond, WA (US)

(72) Inventors: Abhas Tandon, Bengaluru (IN); Priyanka Jain Rajendra Kumar, Bengaluru (IN); Ashish Kumar, Bengaluru (IN); Rakhi Kumari, Bengaluru (IN); Kartikeya Shivanand Puri, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 18/333,081

(22) Filed: Jun. 12, 2023

(65) Prior Publication Data

US 2024/0354376 A1 Oct. 24, 2024

Related U.S. Application Data

(60) Provisional application No. 63/497,950, filed on Apr. 24, 2023.

(51) Int. Cl.
 G06F 18/241 (2023.01)
 G06F 40/20 (2020.01)
(52) U.S. Cl.
 CPC ............ G06F 18/241 (2023.01); G06F 40/20 (2020.01)
(58) Field of Classification Search
 CPC ............................... G06F 18/241; G06F 40/20

USPC .......................................................... 715/708
See application file for complete search history.

(56) References Cited

U.S. PATENT DOCUMENTS

| | | | | |
|---|---|---|---|---|
| 2002/0104087 A1* | 8/2002 | Schaffer | ............. | H04N 21/4756 |
| | | | | 725/9 |
| 2007/0055668 A1* | 3/2007 | Main | .................... | G06F 16/9535 |
| | | | | 707/999.009 |
| 2018/0052884 A1* | 2/2018 | Kale | ...................... | G06F 16/242 |
| 2018/0052885 A1* | 2/2018 | Gaskill | .................... | G06N 5/04 |

* cited by examiner

*Primary Examiner* — Stephen S Hong
*Assistant Examiner* — Broderick C Anderson
(74) *Attorney, Agent, or Firm* — NICHOLSON DE VOS & ELLIOTT LLP

(57) ABSTRACT

Methods, systems, and apparatuses include receiving input of a selection from a client device providing a graphical user interface and a recommendation interface, where the input of the selection includes an explicit attribute. Implicit attribute suggestions are generated based on the explicit attribute. The implicit attribute suggestions are sent to the client device. Attribute selections including at least one implicit attribute suggestion are received from the client device. Prompts are created based on the attribute selections. A generative language model is applied to the prompts. Content including a suggested user recommendation for the first user profile is output by the generative language model based on the prompts. The suggested user recommendation is sent to the client device to cause the suggested user recommendation to be presented on the recommendation interface.

20 Claims, 15 Drawing Sheets

INSTRUCTIONS 410

PROMPT INPUTS 420

EXPLICIT ATTRIBUTES 422

IMPLICIT ATTRIBUTES 424

EXAMPLES 440

TONE 442

STYLE 444

LENGTH 446

PROMPT 114

400

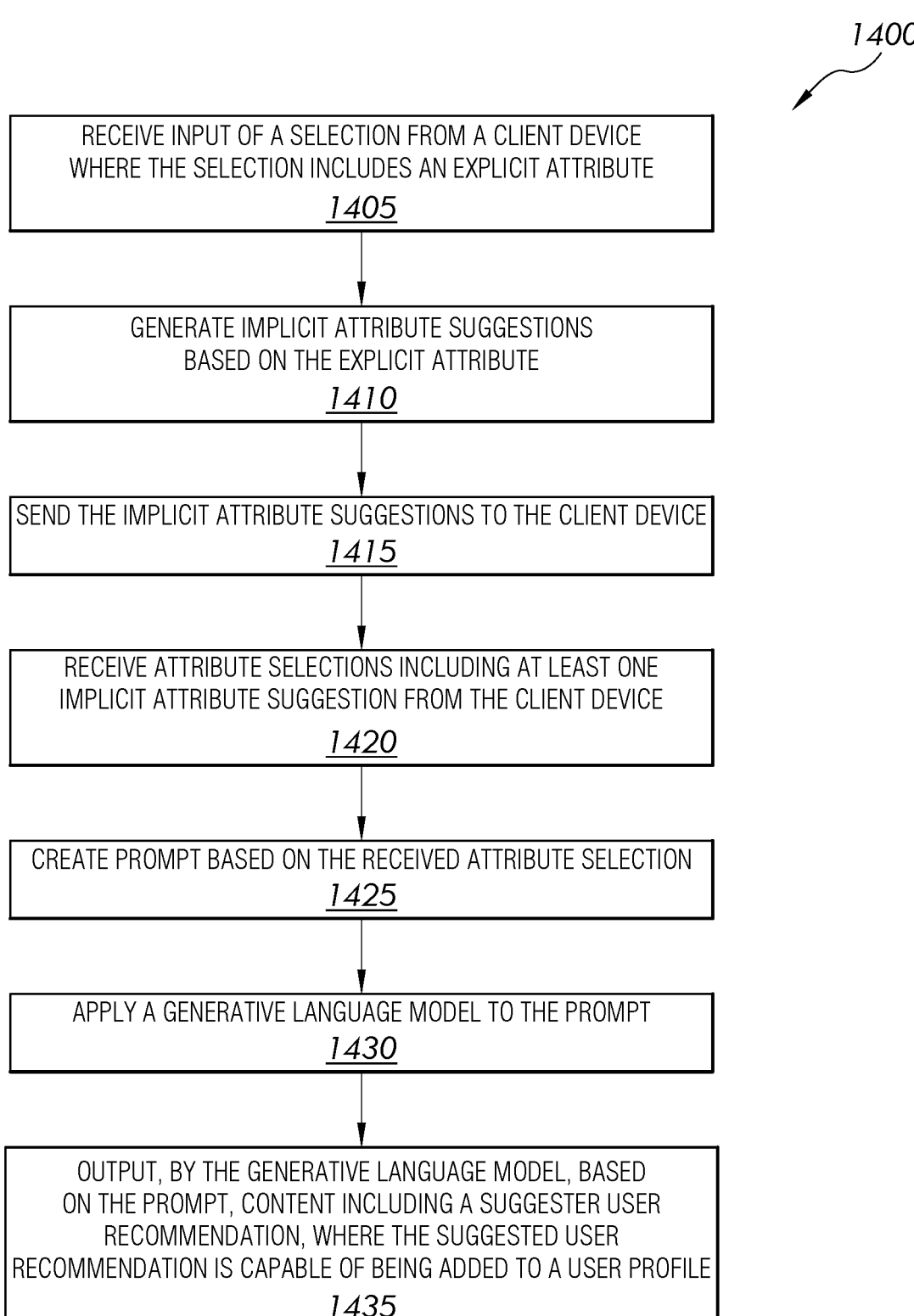

*1400*

RECEIVE INPUT OF A SELECTION FROM A CLIENT DEVICE
WHERE THE SELECTION INCLUDES AN EXPLICIT ATTRIBUTE
*1405*

GENERATE IMPLICIT ATTRIBUTE SUGGESTIONS
BASED ON THE EXPLICIT ATTRIBUTE
*1410*

SEND THE IMPLICIT ATTRIBUTE SUGGESTIONS TO THE CLIENT DEVICE
*1415*

RECEIVE ATTRIBUTE SELECTIONS INCLUDING AT LEAST ONE
IMPLICIT ATTRIBUTE SUGGESTION FROM THE CLIENT DEVICE
*1420*

CREATE PROMPT BASED ON THE RECEIVED ATTRIBUTE SELECTION
*1425*

APPLY A GENERATIVE LANGUAGE MODEL TO THE PROMPT
*1430*

OUTPUT, BY THE GENERATIVE LANGUAGE MODEL, BASED
ON THE PROMPT, CONTENT INCLUDING A SUGGESTER USER
RECOMMENDATION, WHERE THE SUGGESTED USER
RECOMMENDATION IS CAPABLE OF BEING ADDED TO A USER PROFILE
*1435*

FIG. 14

GENERATIVE SYSTEM FOR WRITING ENTITY RECOMMENDATIONS

CROSS-REFERENCE TO RELATED APPLICATIONS

The present application claims the benefit under 35 U.S.C. § 119 (e) of U.S. Provisional Patent Application Ser. No. 63/497,950 filed Apr. 24, 2023, which is incorporated herein by this reference in its entirety.

TECHNICAL FIELD

The present disclosure generally relates to machine learning models, and more specifically, relates to prompt generation for machine learning models.

BACKGROUND ART

Machine learning is a category of artificial intelligence. In machine learning, a model is defined by a machine learning algorithm. A machine learning algorithm is a mathematical and/or logical expression of a relationship between inputs to and outputs of the machine learning model. The model is trained by applying the machine learning algorithm to input data. A trained model can be applied to new instances of input data to generate model output. Machine learning model output can include a prediction, a score, or an inference, in response to a new instance of input data. Application systems can use the output of trained machine learning models to determine downstream execution decisions, such as decisions regarding various user interface functionality.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 14 is a flow diagram of an example method to generate recommendations in accordance with some embodiments of the present disclosure.

DETAILED DESCRIPTION

Figure 1:
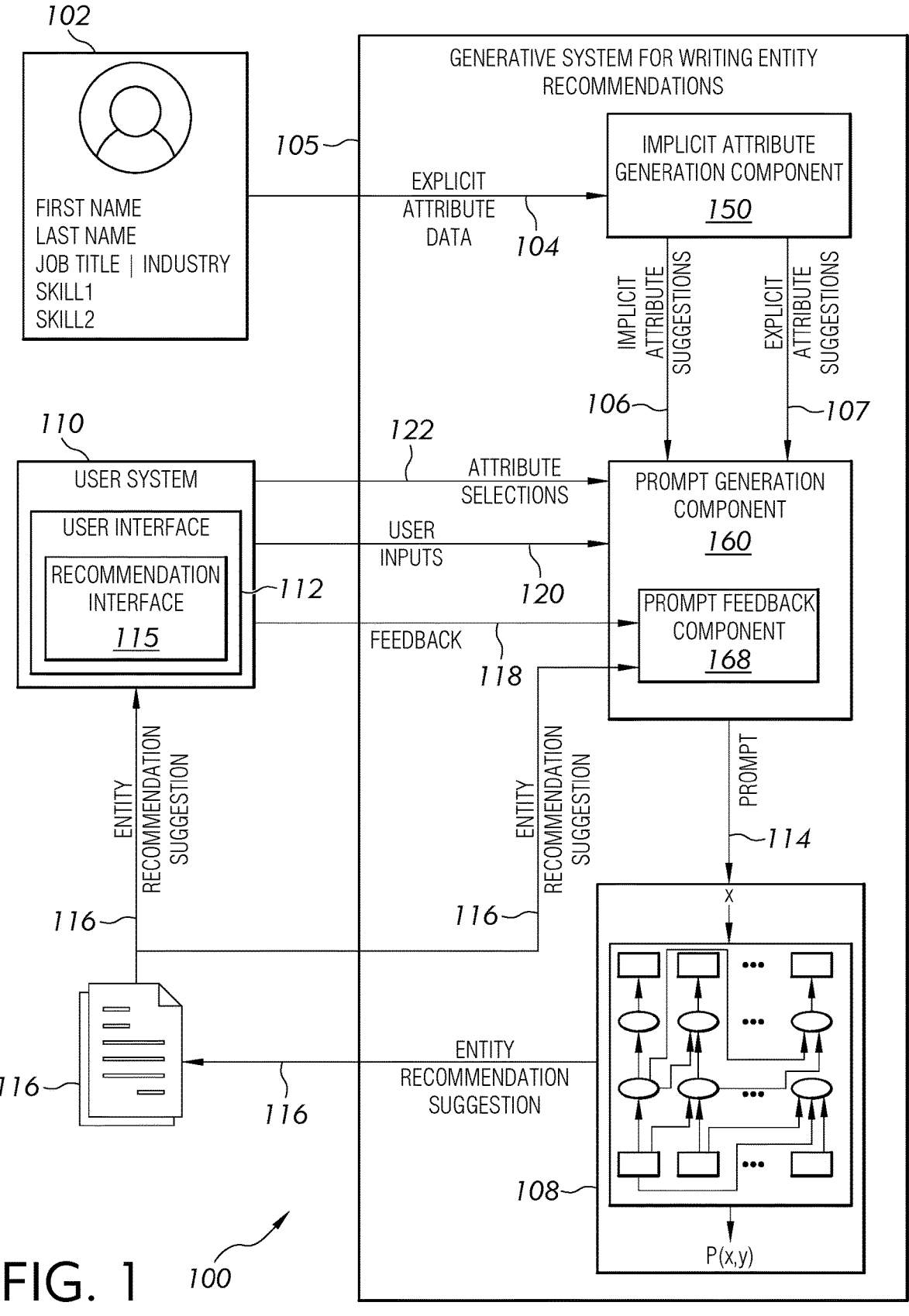
FIG. 1 illustrates an example recommendation writing system that includes a generative system for writing entity recommendations in accordance with some embodiments of the present disclosure.

A generative entity recommendation writing system as described herein includes a number of different components that alone or in combination address the above and other shortcomings of conventional recommendation systems, particularly when applied to the machine generation of user recommendations. An entity is a profile associated with a social graph network such as a user, company, organization, institution, content item, job posting, etc. A recommendation is a document that contains information about a recommended entity that is written by a recommending entity. A recommendation can be, for example, a recommendation for a skill of the recommended entity on behalf of the recommending entity (e.g., a previous employer recommending their former employee based on their past work).

The generative entity recommendation writing system can generate these recommendations on behalf of users of the social graph network with little to no user involvement. The generative entity recommendation writing system can generate implicit attributes for an entity based on a profile and use these implicit attributes to generate the entity recommendation. An implicit attribute is an attribute about a particular entity, e.g., a user, company, organization, institution, content item, job posting, etc., that is not explicitly expressed (where explicitly expressed includes, e.g., user input that is received and stored as a data value stored in a data store and/or displayed via a user interface) but rather is implied (e.g., mathematically, statistically, or probabilistically inferred) based on other information such as attributes that are explicitly expressed.

As an example, an explicit attribute can include one or more pieces of data that are input by a user for inclusion in the user's profile in an application software system, such as the user's profile page of a social network service. Examples of explicit attributes can include user name, employer name, job title, and skills. Examples of implicit attributes can include a user-specific preference, a generalized personality trait, an interpersonal skill, and/or technical skills of a user that are not explicitly expressed but instead are implied based on explicit data stored in connection with the user profile. The generative entity recommendation writing system can use explicit attributes for an entity to generate implicit attributes which are then used for generating the entity recommendation.

Conventional recommendation systems contain only empty text boxes and rely on users to draft recommendations themselves with little to no assistance. Because of the high barrier required to write a recommendation, many users that may have otherwise written a recommendation will not do so. This causes bias in the recommendations and a general lack of data which can weaken the overall recommendation system. Generative models may be used to generate recommendations and relieve the burden on the human users.

A generative model uses artificial intelligence technology to machine-generate new digital content based on model inputs and the data with which the model has been trained. Whereas discriminative models are based on conditional probabilities P (y|x), that is, the probability of an output y given an input x (e.g., is this a photo of a dog?), generative models capture joint probabilities P (x, y), that is, the likelihood of x and y occurring together (e.g., given this photo of a dog and an unknown person, what is the likelihood that the person is the dog's owner, Sam?).

A generative language model generates new text in response to model input. The model input includes a task description, also referred to as a prompt. The task description can include an instruction and/or an example of digital content. A task description can be in the form of natural language text, such as a question or a statement, and can include non-text forms of content, such as digital imagery and digital audio. Given a task description, a generative model can generate a set of task description-output pairs, where each pair contains a different output, and assign a score to each of the generated task-description-output pairs. The output in a given task description-output pair contains text that is generated by the model rather than provided to the model as an input.

The score associated by the model with a given task description-output pair represents a probabilistic or statistical likelihood of there being a relationship between the output and the corresponding task description in the task description-output pair. For example, given an image of an animal and an unknown person, a generative model could generate the following task description-output pairs and associated scores: [what is this a picture of?; this is a picture of a dog playing with a young boy near a lake; 0.9], [what is this a picture of?; this is a picture of a dog walking with an old woman on a beach; 0.1]. The higher score of 0.9 indicates a higher likelihood that the picture shows a dog playing with a young boy near a lake rather than a dog walking with an old woman on a beach. The score for a given task description-output pair is dependent upon the way the generative model has been trained and the data used to perform the model training. The generative model can sort the task description-output pairs by score and output only the pair or pairs with the top k scores, where k is a positive integer. For example, the model could discard the lower-scoring pairs and only output the top-scoring pair as its final output.

Generative machine learning models have many potential uses. However, there are shortcomings that present technical challenges to the widespread use of generative machine learning models for generating entity recommendations. For example, conventional generative machine learning models for generating new content require human intervention both to ensure that model output does not diverge from a given task description and to prevent the model from generating output that is too similar to the task description or previous outputs. Similarly, conventional generative machine learning models rely heavily on human intervention to generate the task description for content generation.

Additionally, some conventional generative machine learning models have limits on the length or size of the inputs (e.g., data included in the task description) that the models can receive or otherwise constrain the input parameter values. These limits can impact the quality of the model output, particularly if the task description is not well-designed. Quality as used herein may refer to an objective determination such as a machine-determined difference between an expected model output and an actual model output, which also may be referred to as loss. In conventional systems, determining what constitutes a well-designed task description is a trial-and-error process involving a human formulating task descriptions, observing model outputs, and modifying the task descriptions based on the model outputs. Further, training a machine learning model is a resource intensive process that involves time-consuming human experimentation to generate training data and requires subject matter expertise to configure the model architecture and hyperparameters to produce reliable output for real world tasks.

Another shortcoming of conventional generative machine learning models specifically as they relate to entity recommendations is that the conventional models have not successfully generated output (e.g., machine-generated natural language text) based on implicit attributes. By failing to account for implicit attributes, conventional generative machine learning models have been unable to machine-generate output (e.g., natural language text) that includes references to personality traits, interpersonal skills, and/or technical skills, and the generated text therefore does not sound like it was written by a human. Additionally, conventional generative machine learning models struggle to generate content (e.g., natural language text) with varying semantic and syntactical structures expected of a human writer. This shortcoming is due, in part, to the generalized nature of the data used to train the models. For example, certain conventional generative machine learning models, such as large language models, are not trained on domain-specific data and/or data that is relevant to specific domains. Domain-specific data is data that is used in a particular field that may not apply to other fields. For example, domain-specific data may involve skills and terminology that are used in a specific occupation. As a result of excluding the domain-specific data, conventional large language models fail to generate text with, e.g., tones, semantics and/or syntaxes that are customized for domain-specific environments.

The generative entity recommendation writing system utilizes domain-specific data and implicit attributes to generate entity recommendations with tones, semantics and syntaxes that are applicable for the desired domain and include text generated based on the implicit attributes. For example, the generative entity recommendation writing system can leverage implicit attribute data to generate user recommendations including information that is otherwise unavailable. Additionally, the generative entity recommendation writing system can generate entity recommendations which have different tones, semantics, and syntax depending on the specific explicit and/or implicit attributes of the recommender entity creating the recommendation and the recommendee, i.e., the entity who is the subject of the recommendation. As described in more detail below, embodiments of the generative entity recommendation writing system described includes an implicit attribute generation component, a prompt generation component, a prompt feedback component, and a generative machine learning model component.

FIG. 1 illustrates an example of a generative entity recommendation writing system for generative language models in accordance with some embodiments of the present disclosure.

In the example of FIG. 1, a recommendation generation system 100 includes a generative system for writing entity recommendations 105 including implicit attribute generation component 150, a prompt generation component 160, and generative machine learning model 108. The generative system for writing entity recommendations 105 interfaces with one or more components of an application software system (such as application software system 230 of FIG. 2) that create, edit, and store entity profiles, network activity data, and related data such as rankings, scores, and labels. For example, in FIG. 1, a profile 102 has been created and stored by an online system, such as a professional social network system or another type of application software system. Profile 102 contains explicit attribute data 104 including descriptors of the skills and capabilities of the user or entity associated with profile 102. These descriptors include, in the example of FIG. 1, a job title, an industry, professional experience, education, certifications, and skills, e.g., {Skill1, Skill2}. In some embodiments, the various attribute data and the network activity data is unique to the social network system such that the generative system for writing entity recommendations is in communication with the social network system and is uniquely positioned and uniquely capable of generating digital content that is highly relevant, personalized, and effective for the users of the social network system.

In some embodiments, although illustrated separately, all or a portion of generative system for writing entity recommendations 105 is implemented by user system 110 or another client device of recommendation generation system 100. For example, while not specifically shown in the drawings, one or more portions of generative system for writing entity recommendations 105 are implemented entirely on a client device, in some implementations.

Descriptor as used herein may refer to a piece of digital data, such as a word, phrase, feature, digital image, digital audio, digital video, or graphic, that can be used to describe or identify an entity or an activity. In some embodiments, descriptors include one or more of: a job title, an industry, skills, experience, certifications, publications, honors, education, and similar descriptors. Entity as used herein may refer to a user of an online system or another type of entity, such as a company or organization, a content item, or an attribute. For example, in a social networking application, entities can include a page with which a user of the online system can interact. For example, an entity could be a profile, a profile for a group of people, an organization profile, a job posting, etc. Activity as used herein may refer to network activity, such as digital communications between computing devices and systems. Examples of network activity include initiating a session with an online system by, e.g., logging in to an application, initiating a page load to load a web page into a browser, uploading, downloading, creating, and sharing digital content items on the network, and executing social actions, such as sending messages and/or adding comments or social reactions to articles or posts on the network.

In some embodiments, profile 102 is a profile for an entity being recommended (recommended entity) by the user of user system 110 (recommending entity). In other embodiments, profile 102 is a profile of an entity with similar and/or relevant attribute data to the recommended entity. Implicit attribute generation component 150 receives explicit attribute data from the recommended entity and determines profile 102 based on similarities between the attribute data of the recommended entity and explicit attribute data 104 of profile 102. For example, implicit attribute generation component 150 determines that a user profile does include sufficient attribute data for recommendation generation and uses a user attribute of the attribute data (e.g., experience or job title) to find profile 102 that shares the same user attribute. Implicit attribute generation component 150 extracts explicit attribute data 104 from the found profile 102 to generate the recommendation for the recommended user. In some embodiments, respective attribute data may be associated with different tiers of entities, such as an individual member, a group of members, an organization, and the like. In some embodiments, profile 102 is a profile for an organization or group. For example, profile 102 is a profile for a company.

Figure 2:
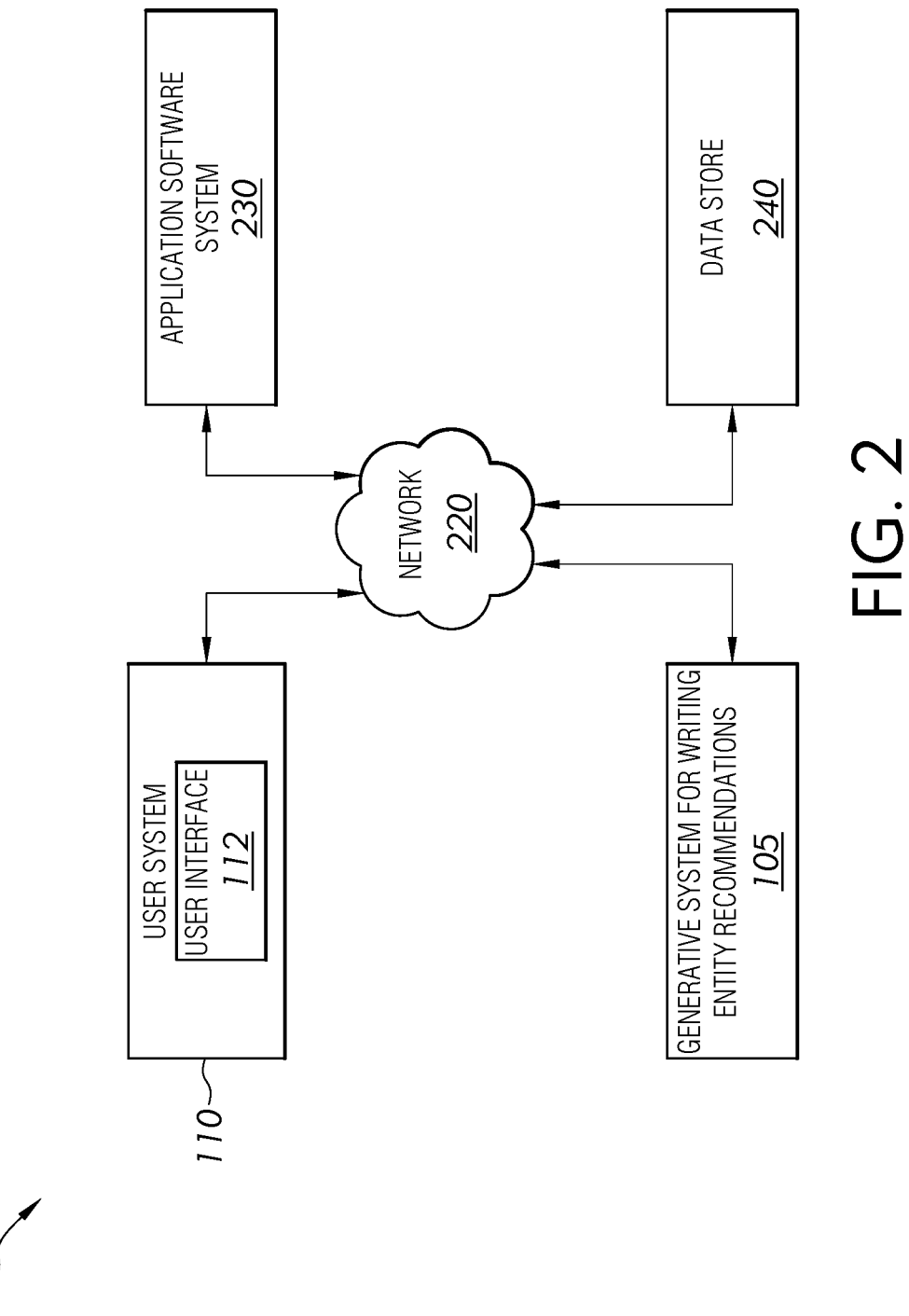
FIG. 2 illustrates another example computing system that includes a generative system for writing entity recommendations in accordance with some embodiments of the present disclosure.

Implicit attribute generation component 150 extracts explicit attribute data 104 from the online system by, for example, executing one or more queries on one or more data stores of the online system (such as data store 240 of FIG. 2). In some embodiments, implicit attribute generation component 150 extracts explicit attribute data 104 from the online system in response to a user input received by an application software system. For example, application software system 230 of FIG. 2 receives a user input from user system 110 as described in further detail with reference to FIG. 5. The application software system then executes one or more queries on one or more data stores or causes implicit attribute generation component 150 to execute the one or more queries on the one or more data stores. In response to the execution of the one or more queries, implicit attribute generation component 150 extracts explicit attribute data 104 from the one or more data stores associated with profile 102. Explicit attribute data 104 includes data that is specific to a user or a user group of the online system. For example, explicit attribute data 104 are descriptors specific to profile 102 (e.g., a job title, an industry, skills, experience, certifications, publications, honors, education, and similar descriptors).

Implicit attribute generation component 150 generates implicit attribute suggestions 106 using explicit attribute data 104. In one embodiment, implicit attribute generation component 150 uses explicit attribute data 104 as an input to a machine learning model that outputs attribute suggestions including implicit attribute suggestions 106 and explicit attribute suggestions including classifiers identifying whether an attribute is an implicit attribute (e.g., belongs to implicit attribute suggestions 106) or whether the attribute is an explicit attribute (e.g., belongs to explicit attribute suggestions 107). For example, prompt generation component 160 inputs explicit attribute data 104 including a job title for profile 102 into a machine learning model which determines implicit attribute suggestions 106 based on the job title as well as explicit attribute suggestions based on the job title and the rest of explicit attribute data 104. The machine learning model also classifies the implicit attribute suggestions 106 and explicit attribute suggestions 107 based on whether the attributes are explicit (e.g., listed in profile 102) or whether the attributes are implicit (e.g., not listed in profile 102). Further details with respect to implicit attribute generation component 150, implicit attribute suggestions 106, and explicit attribute suggestions 107 are described with reference to FIG. 3.

In some embodiments, implicit attribute generation component 150 sends implicit attribute suggestions 106 and explicit attribute suggestions 107 to application software system to be displayed on recommendation interface 115 of user interface 112. For example, implicit attribute generation component 150 sends implicit attribute suggestions 106 and explicit attribute suggestions 107 to application software system 230 of FIG. 2 causing prompt attributes to be displayed on graphical user interface 500 as described in further detail with reference to FIG. 6.

Prompt generation component 160 receives implicit attribute suggestions 106, explicit attribute suggestions 107, user inputs 120, and attribute selections 122 and creates prompt 114. In some embodiments, prompt generation component 160 generates prompt 114 using user inputs 120 and attribute selections 122. User inputs 120 are inputs received by the application software system from user system 110 in response to a user interaction with recommendation interface 115 and/or user interface 112 of user system 110. For example, as explained in further detail with references to FIGS. 6-12, an interaction with recommendation interface 115 and/or user interface 112 causes user system 110 to send user inputs 120 and attribute selections 122 to application software system 230 based on the interaction. In some embodiments, prompt 114 includes instructions 410, prompt inputs 420, and examples 450. Further details about prompt 114 are discussed with reference to FIG. 4.

As shown in FIG. 1, prompt generation component 160 can include a prompt feedback component 168. For example, prompt generation component 160 generates an initial prompt using implicit attribute suggestions 106, explicit attribute suggestions 107, user inputs 120, and attribute selections 122. Prompt generation component 160 uses these prompt inputs and a set of instructions to create prompt 114. In some embodiments, prompt generation component 160 generates the set of instructions. For example, prompt generation component 160 generates the set of instructions based on one or more of explicit attribute data 104, implicit attribute suggestions 106, explicit attribute suggestions 107, user inputs 120, and attribute selections 122. In other embodiments, the set of instructions is pre-stored and extracted from a data store (such as data store 240 of FIG. 2). In still other embodiments, an initial set of instructions is prestored and extracted from the data store and prompt generation component 160 uses the initial set of instructions to generate the set of instructions used for creating prompt 114. For example, prompt generation component 160 uses the initial set of instructions and one or more of explicit attribute data 104, implicit attribute suggestions 106, explicit attribute suggestions 107, user inputs 120, and attribute selections 122 to generate the set of instructions used for creating prompt 114. The term set of instructions as used in this disclosure can be a single instruction or multiple instructions. Further details about the set of instructions are discussed with reference to FIG. 4.

Figure 4:
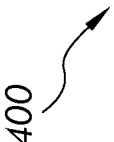
FIG. 4 illustrates an example prompt system in accordance with some embodiments of the present disclosure.

In some embodiments, prompt generation component 160 maps attribute selections 122 to a set of prompt inputs (e.g., prompt inputs 420 of FIG. 4). For example, prompt generation component 160 maps implicit attribute suggestions 106 and/or explicit attribute suggestions 107 that are included in attribute selections 122 while excluding implicit attribute suggestions 106 and/or explicit attribute suggestions 107 that are not included in attribute selections 122. In some embodiments, the set of implicit attribute suggestions 106 and/or explicit attribute suggestions 107 that are mapped includes user inputs 120. The terms set of implicit attribute suggestions 106 and/or set of explicit attribute suggestions

107 as used in this disclosure can be a single attribute or multiple attributes. Further details about prompt generation are described with reference to FIG. 4.

Prompt generation component 160 creates prompt 114, x, based on the implicit attribute suggestions 106, explicit attribute suggestions 107, user inputs 120, and attribute selections 122. In some embodiments, prompt generation component 160 creates more than one prompt. As shown in FIG. 4, prompt 114 can include instructions 410, prompt input 420, and examples 440. Although illustrated as including instructions 410, prompt input 420, and examples 440, prompt 114 can include different combinations of one or more of these as well as include further components. Further details about prompt generation component 160 are described with reference to FIG. 4.

For each prompt 114, x, the generative machine learning model 108 produces one or more outputs y and, for each output y, a score P (x, y) that indicates a likelihood of the prompt x and the respective output y occurring together. Using the output(s) y and corresponding score(s) P (x, y), the generative machine learning model 108 generates first versions of one or more entity recommendation suggestions 116. In some embodiments, the first versions of the one or more entity recommendation suggestions 116 each include at least one piece of writing that has been machine-generated by the generative machine learning model 108. For example, the recommendation suggestions include suggestions for adding content such as a written user recommendation to profile 102.

In other words, output of the generative machine learning model 108 can be customized for a particular user, pair of users, or user group of the online system based on the attribute selections 122 and user inputs 120 used to generate the task descriptions (e.g., prompts) to which the generative machine learning model 108 is applied. For example, if a particular job title is common to many users of the online system, a prompt can be configured based on the implicit and explicit attributes associated with that job title so that the generative machine learning model 108 generates recommendation text pertaining to the job title. Since users have the ability to select the applicable implicit and explicit attributes, over time recommendation generation system 100 learns the best attributes for specific combinations of explicit attribute data 104 and is able to suggest applicable attributes. Additionally, since users do not typically write about their personal qualities in their profiles, generative system for writing entity recommendations 105 is able to provide recommendations that discuss such implicit attributes without having to receive them from a recommender. By reducing the barrier of entry to recommending other users, the recommendation system can grow and become more dynamic allowing the models (e.g., language model 305, domain specific language model 310, classifier language model 315, and generative machine learning model 108) to more accurately generate recommendations. Further details with regards to language model 305, domain specific language model 310, and classifier language model 315 are described with reference to FIG. 3.

In some embodiments, the generative machine learning model 108 includes a generative model that is configured using artificial intelligence-based technologies to machine-generate natural language text. In some embodiments, generative machine learning model 108 also or alternatively includes one or more generative models that are configured to machine-generate other forms of digital content, such as images, audio, video, etc. Thus, while the term generative language model can be used to refer to generative models that generate text, as used herein, a generative language model can include one or more components that generate non-text output or a combination of text and non-text output.

In some implementations, the generative machine learning model 108 is constructed using a neural network-based machine learning model architecture. In some implementations, the neural network-based architecture includes one or more self-attention layers that allow the model to assign different weights to different words or phrases included in the model input. Alternatively, or in addition, the neural network architecture includes feed-forward layers and residual connections that allow the model to machine-learn complex data patterns including relationships between different words or phrases in multiple different contexts. In some implementations, the generative machine learning model 108 is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the generative system for writing entity recommendations 105.

Generative machine learning model 108 is trained on a large dataset of natural language text. The size and composition of the dataset used to train the generative machine learning model 108 can vary according to the requirements of a particular design or implementation of the recommendation generation system 100. In some implementations, the dataset used to train the generative machine learning model 108 includes hundreds of thousands to millions or more different natural language text training samples. In some embodiments, generative machine learning model 108 includes multiple generative language models trained on differently sized datasets. For example, generative machine learning model 108 can include a high-capacity model (e.g., language generation model with a large number of parameters of non-constant values) used for generating examples as well as a low-capacity model (e.g., language generation model with a smaller number of parameters), which uses the examples from the high-capacity model to generate its own outputs.

Generative machine learning model 108 outputs entity recommendation suggestion 116 which is sent to user system 110. In some embodiments, user system 110 receives and displays entity recommendation suggestion 116 on user interface 112. For example, user system 110 displays entity recommendation suggestion 116 on recommendation interface 115 of user interface 112. Further details about displaying recommendation interface 115 and entity recommendation suggestion 116 are discussed with reference to FIGS. 5-13. Entity recommendation suggestion 116 includes data generated by generative machine learning model 108, such as generated language relating to profile 102. For example, entity recommendation suggestion 116 can include text for a suggested recommendation for profile 102 based on implicit attribute suggestions 106 and/or explicit attribute suggestions 107 of profile 102 as well as user inputs 120 and attribute selections 122.

In some embodiments, generative machine learning model 108 sends entity recommendation suggestion 116 to prompt feedback component 168 of prompt generation component 160. Prompt feedback component 168 is a component that receives entity recommendation suggestion 116 from generative machine learning model 108 and feedback 118 from user system 110 and uses them to update prompt 114 and/or generate future prompts.

In some embodiments, prompt feedback component 168 includes a trained inference machine learning model which is trained on sentence pairs and uses logical rules about language modeling to generate a performance parameter for the entity recommendation suggestion 116. For example, the inference machine learning model is trained to determine whether sentences are redundant and/or contradictory. The inference machine learning model can be, for example, a Multi-Genre Natural Language Inference (MNLI) model or an Adversarial Natural Language Inference (ANLI) model. Prompt feedback component 168 includes the inference machine learning model which uses sentences of entity recommendation suggestion 116 as inputs and determines the performance parameter by labeling pairs of sentences of entity recommendation suggestion 116 as contradictions and/or redundancies. Prompt feedback component 168 determines the performance parameter based on the outputs of the inference machine learning model. For example, prompt feedback component 168 determines the performance parameter based on the number of pairs of sentences compared and the number of contradictions and/or redundancies labeled. In some embodiments, prompt feedback component 168 compares the performance parameter with a threshold. For example, the threshold may be a number of pairs of sentences labeled contradictory and/or redundant or a ratio of contradictory/redundant sentence pairs to overall number of sentence pairs. Prompt feedback component 168 determines that the performance parameter satisfies the threshold if the comparison indicates that the entity recommendation suggestion 116 includes an unacceptable number of contradictions and/or redundancies or an unacceptable ratio of contradictory and/or redundant sentence pairs to total sentence pairs. In some embodiments, the threshold is set such that prompt feedback component 168 does not allow any contradictory and/or redundant sentence pairs.

In some embodiments, prompt feedback component 168 receives feedback from user system 110. For example, user system 110 includes user interface 112 and, as explained with reference to FIGS. 5-13, user interface 112 includes a graphical user interface (such as graphical user interface 500 of FIGS. 5-13). The graphical user interface can include recommendation interface 115 displaying entity recommendation suggestion 116 with which a user can interact. For example, the recommendation generation interface displays entity recommendation suggestion 116 and the user interacts with recommendation interface 115 to generate a new entity recommendation suggestion. In response to receiving this interaction, user system 110 sends feedback 118 to prompt feedback component 168, indicating that entity recommendation suggestion 116 should be regenerated. In some embodiments, prompt feedback component 168 generates a performance parameter for entity recommendation suggestion 116 based on feedback 118. For example, feedback such as refreshing, regenerating, or changing entity recommendation suggestion 116 (e.g., receiving an interaction with recommendation regeneration button 1210 of FIG. 12) is labeled as negative whereas feedback such as accepting entity recommendation suggestion 116 (e.g., receiving an interaction with recommendation submit button 635 of FIGS. 6-13) is labeled as positive.

In some embodiments, receiving negatively labeled feedback causes prompt generation component 160 to determine that the performance parameter does not meet a threshold. In some embodiments, prompt feedback component 168 generates training data using feedback 118 and prompt 114 to train a prompt generation machine learning model. For example, prompt feedback component 168 trains a domain specific language model (such as domain specific language model 310 of FIG. 3) using prompts and their associated labels. In some embodiments, implicit attribute generation component 150 and prompt generation component 160 use the prompt generation machine learning model to generate their respective outputs.

In the embodiment of FIG. 2, computing system 200 includes a user system 110, a network 220, an application software system 230, a data store 240, and a generative system for writing entity recommendations 105. Each of these components of computing system 200 are described in more detail below.

User system 110 includes at least one computing device, such as a personal computing device, a server, a mobile computing device, or a smart appliance. User system 110 includes at least one software application, including a user interface 112, installed on or accessible by a network to a computing device. For example, user interface 112 can be or include a front-end portion of application software system 230.

User interface 112 is any type of user interface as described above. User interface 112 can be used to input search queries and view or otherwise perceive output that includes data produced by application software system 230. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs). Further details about user interface 112 are disclosed with reference to FIGS. 5-13.

Network 220 can be implemented on any medium or mechanism that provides for the exchange of data, signals, and/or instructions between the various components of computing system 200. Examples of network 220 include, without limitation, a Local Area Network (LAN), a Wide Area Network (WAN), an Ethernet network or the Internet, or at least one terrestrial, satellite or wireless link, or a combination of any number of different networks and/or communication links.

Application software system 230 is any type of application software system that includes or utilizes functionality and/or outputs provided by generative system for writing entity recommendations 105. Examples of application software system 230 include but are not limited to online services including connections network software, such as social media platforms, and systems that are or are not be based on connections network software, such as general-purpose search engines, content distribution systems including media feeds, bulletin boards, and messaging systems, special purpose software such as but not limited to job search software, recruiter search software, sales assistance software, advertising software, learning and education software, enterprise systems, customer relationship management (CRM) systems, or any combination of any of the foregoing.

A client portion of application software system 230 can operate in user system 110, for example as a plugin or widget in a graphical user interface of a software application or as a web browser executing user interface 112. In an embodiment, a web browser can transmit an HTTP (Hyper Text Transfer Protocol) request over a network (e.g., the Internet) in response to user input that is received through a user interface provided by the web application and displayed through the web browser. A server running application software system 230 and/or a server portion of application software system 230 can receive the input, perform at least one operation using the input, and return output using an HTTP response that the web browser receives and processes.

Data store 240 can include any combination of different types of memory devices. Data store 240 stores digital data used by user system 110, application software system 230, generative system for writing entity recommendations 105. Data store 240 can reside on at least one persistent and/or volatile storage device that can reside within the same local network as at least one other device of computing system 200 and/or in a network that is remote relative to at least one other device of computing system 200. Thus, although depicted as being included in computing system 200, portions of data store 240 can be part of computing system 200 or accessed by computing system 200 over a network, such as network 220.

While not specifically shown, it should be understood that any of user system 110, application software system 230, data store 240, and generative system for writing entity recommendations 105 includes an interface embodied as computer programming code stored in computer memory that when executed causes a computing device to enable bidirectional communication with any other of user system 110, application software system 230, data store 240, and generative system for writing entity recommendations 105 using a communicative coupling mechanism. Examples of communicative coupling mechanisms include network interfaces, inter-process communication (IPC) interfaces and application program interfaces (APIs).

Each of user system 110, application software system 230, data store 240, and generative system for writing entity recommendations 105 is implemented using at least one computing device that is communicatively coupled to electronic communications network 220. Any of user system 110, application software system 230, data store 240, and generative system for writing entity recommendations 105 can be bidirectionally communicatively coupled by network 220. User system 110 as well as one or more different user systems (not shown) can be bidirectionally communicatively coupled to application software system 230.

A typical user of user system 110 can be an administrator or end user of application software system 230, and/or generative system for writing entity recommendations 105. User system 110 is configured to communicate bidirectionally with any of application software system 230, data store 240, and/or generative system for writing entity recommendations 105 over network 220.

The features and functionality of user system 110, application software system 230, data store 240, and generative system for writing entity recommendations 105 are implemented using computer software, hardware, or software and hardware, and can include combinations of automated functionality, data structures, and digital data, which are represented schematically in the figures. User system 110, application software system 230, data store 240, and generative system for writing entity recommendations 105 are shown as separate elements in FIG. 2 for case of discussion but the illustration is not meant to imply that separation of these elements is required. The illustrated systems, services, and data stores (or their functionality) can be divided over any number of physical systems, including a single physical computer system, and can communicate with each other in any appropriate manner.

Figure 3:
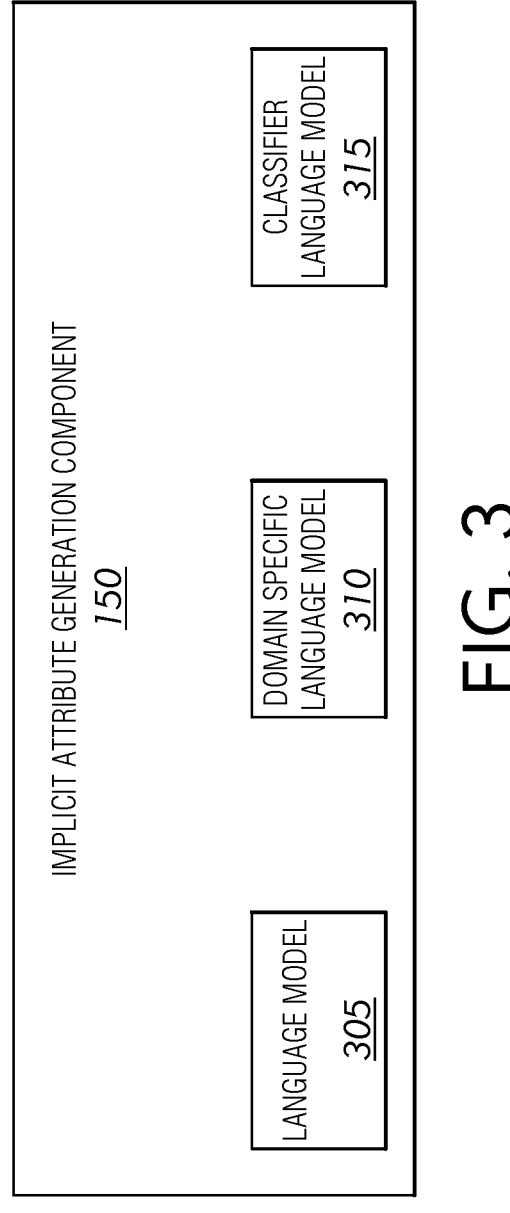
FIG. 3 illustrates another example computing system that includes an implicit attribute generation component in accordance with some embodiments of the present disclosure.

FIG. 3 illustrates another example computing system 300 that includes implicit attribute generation component 150 in accordance with some embodiments of the present disclosure. As shown in FIG. 3, implicit attribute generation component 150 includes a language model 305, a domain specific language model 310, and a classifier language model 315. In some embodiments, language model 305 is the base model, domain specific language model 310 is the intermediate model, and classifier language model 315 is the final model. For example, implicit attribute generation component 150 uses transfer learning to take language model 305 which is not adapted to a specific domain and create domain specific language model 310 for a specific domain. As an illustrative example, recommendation generation system 100 can take a general language model that is trained to identify association between words to identify interpersonal skills for a certain job title. These interpersonal skills can then be used in generating recommendations that sound human. For example, because interpersonal skills are not likely to be explicitly stated on a profile, any recommendation generated using only the profile information will not sound like an actual human wrote it and will sound more like a listing of explicitly stated skills. By including interpersonal skills, text generated will sound more like a human who worked with the owner of the profile and has a human relationship with them. These interpersonal skills help to make the generated recommendation sound more human as technical skills alone are insufficient.

Through transfer learning, domain specific language model 310 is trained to incorporate the relevant parts of language model 305 (e.g., grammar and similarities between words). Domain specific language model 310 is further trained to finetune the links between the job titles and interpersonal skills as well as establish links between the job titles and technical skills. Domain specific language model 310 can only be generated using specific knowledge on the links between technical skills and job titles. For example, domain specific language model 310 is trained to identify the technical and interpersonal skills required for various job titles (e.g., implicit attributes and explicit attributes such as those included in implicit attribute suggestions 106 and/or explicit attribute suggestions 107). Through transfer learning classifier language model 315 is trained to label the skills based on whether they are implicit or explicit. For example, interpersonal skills are labeled as implicit and technical skills are labeled as explicit. In some embodiments, classifier language model 315 is trained on labeled data. For example, classifier language model 315 receives data with a number of skills classified as implicit or explicit and learns to classify unlabeled skills as either implicit or explicit based on the labeled data.

In some embodiments, language model 305, domain specific language model 310, and/or classifier language model 315 can filter out semantically similar attributes. For example, implicit attribute generation component 150 may determine a similarity between attributes using one or more of language model 305, domain specific language model 310, and classifier language model 315. Implicit attribute generation component 150 then filters out attributes with high amount of similarity (e.g., greater than a threshold). In some embodiments, implicit attribute generation component 150 filters out attributes based on a confidence level for the machine learning model (e.g., language model 305, domain specific language model 310, and/or classifier language model 315).

Figure 6:
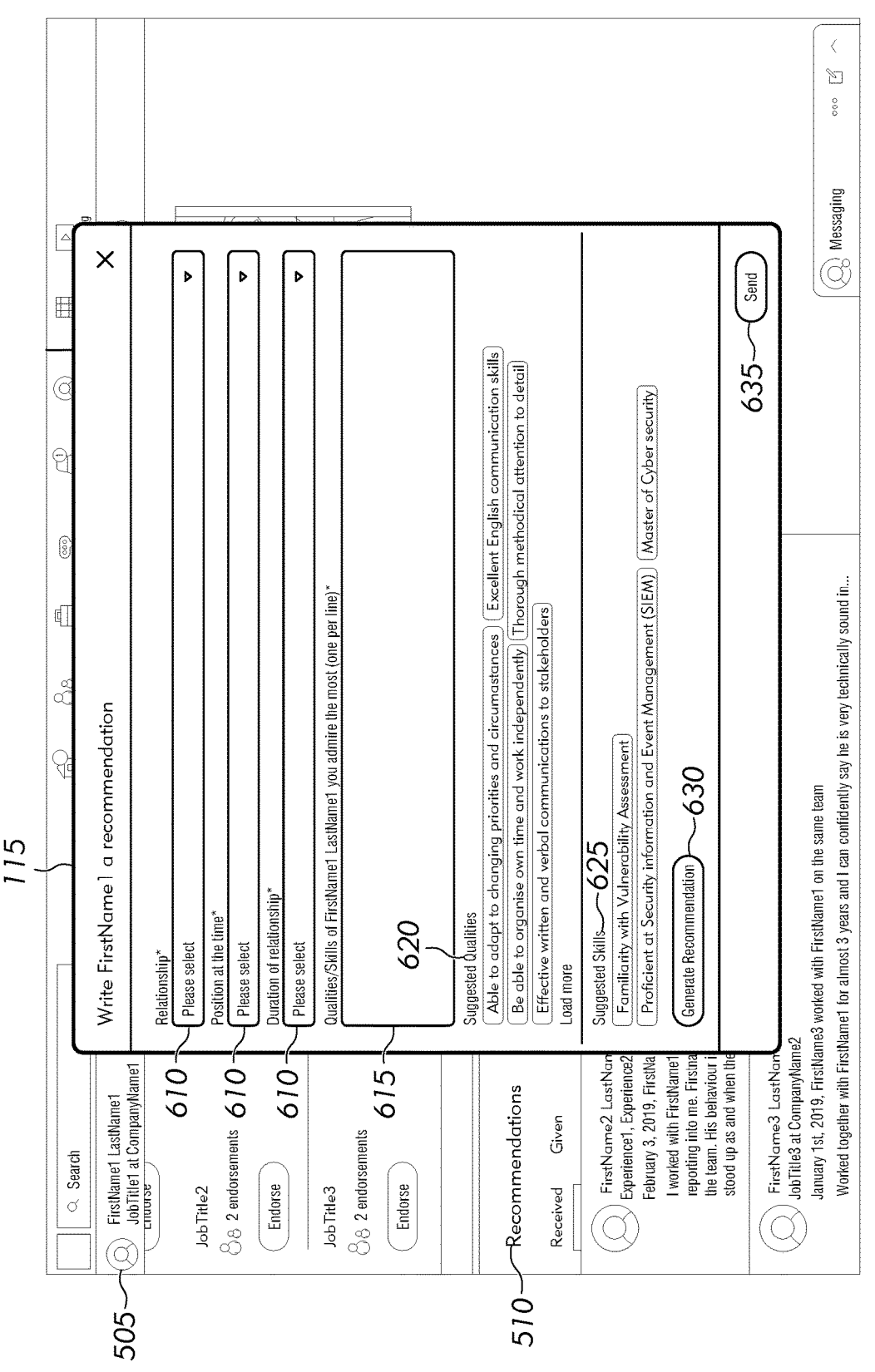
FIG. 6 illustrates the example graphical user interface in accordance with some embodiments of the present disclosure.

In some embodiments, implicit attribute generation component 150 includes a ranking model to rank the prompt attributes. For example, implicit attribute generation component 150 ranks the prompt attributes based on the confidence level for the machine learning model (e.g., language model 305, domain specific language model 310, and/or classifier language model 315). In such embodiments, implicit attribute generation component 150 only sends attribute suggestions which are the highest ranks for relevancy. For example, implicit attribute generation component 150 determines that attributes above a confidence level threshold should be included in implicit attribute suggestions 106 and/or explicit attribute suggestions 107 and sent to prompt generation component 160 whereas attribute suggestions below the confidence level threshold are discarded. In some embodiments, the attribute suggestions having a confidence value below the confidence level are not discarded but are stored and able to be revealed to the user at a later time. For example, as shown in FIG. 6, the user can select a "load more" button causing implicit attribute generation component 150 to send more attributes to be displayed on the graphical user interface.

FIG. 4 illustrates an example prompt system 400 in accordance with some embodiments of the present disclosure. As shown in FIG. 4, prompt 114 can include instructions 410, prompt inputs 420, and examples 440. For example, prompt 114 includes a set of instructions telling a deep learning model, such as generative machine learning model 108 of FIG. 1 to generate a recommendation for a first profile (e.g., profile 505 of FIG. 5) on behalf of a second profile (e.g., profile 520 of FIG. 5). Prompt 114 also includes prompt inputs 420 indicating the recommendation should include certain explicit attributes 422 and implicit attributes 424. For example, prompt 114 includes prompt inputs 420 indicating the recommendation should include attributes selected by the user (e.g., attribute selections 122 of FIG. 1). Additionally, prompt 114 can include an example of recommendation for a profile with the same job title.

In some embodiments, prompt 114 includes instructions 410. Instructions 410 includes data for instructing the generative machine learning model 108 to perform the appropriate task. In some embodiments, instructions 410 is text including instructions for generative machine learning model 108. The text of instructions 410 includes placeholders or gaps for other components of prompt 114. For example, instructions 410 includes gaps for filling in explicit and implicit attributes (such as attribute selections 122 of FIG. 1), and user inputs (such as user inputs 120 of FIG. 1). In some embodiments, instructions 410 includes gaps for filling in examples such as examples 440. In some embodiments, instructions 410 includes gaps for filling in desired tones. For example, desired tones can include text or identifiers indicating a tone for generative machine learning model 108 to use when generating entity recommendation suggestion 116.

In some embodiments, prompt 114 includes prompt inputs 420. Prompt inputs 420 include data to be input into prompt 114. For example, prompt inputs 420 can include attributes 422 and implicit attributes 424 as well as user inputs 120 that fit with instructions 410. For example, instructions 410 include a placeholder indicating where a recommended user's position is inserted and prompt generation component 160 generates prompt 114 by inputting the recommended user's position from user inputs 120 into associated fillers or gaps in instructions 410. Explicit attributes 422 can include skills, experience, certifications, publications, honors, and education, among others. Implicit attributes 424 can include adaptability, communication skills, organization skills, independence, attention to detail, and other similar skills that may not be explicitly disclosed on the user profile. In some embodiments, explicit attributes 422 and/or implicit attributes 424 are determined from a user profile such as profile 102 of FIG. 1. In some embodiments, explicit attributes 422 and/or implicit attributes 424 are determined based on a user profile for a user other than the user associated with profile 102. For example, explicit attributes 422 and/or implicit attributes 424 are attributes for a user profile with the same job title or a similar set of skills as profile 102.

In some embodiments, prompt inputs 420 includes an input for tone 442. For example, prompt inputs 420 includes an input specifying a tone to use when generating the recommendation for prompt 114. In some embodiments, recommendation generation system 100 switches the tone in response to receiving negatively labeled user input for the recommendation suggestion. For example, in response to receiving feedback (e.g., feedback 118) indicating that a user of user system 110 regenerated a recommendation suggestion, prompt generation component 160 changes the tone of the initial prompt (e.g., from informal to professional) and generates an updated recommendation suggestion using the updated prompt with the new tone.

In some embodiments, recommendation generation system 100 uses a user input to determine the tone. For example, a user interacts with a graphical user interface (e.g., graphical user interface 500) indicating that they want an informal tone. In response to this user interaction, prompt generation component 160 generates a prompt with the desired tone. In some embodiments, recommendation generation system 100 uses a user input (e.g., user inputs 120) to determine other prompt inputs 420. For example, a user input can be directed to length 446 or a style 444. In some embodiments, tone 442, style 444, and length 446 are used as examples 440 rather than prompt inputs 420. For example, a prompt input 420 for tone 442, style 444, and/or length 446 explicitly includes the desired tone 442, style 444, and/or length 446 in the prompt (e.g., write a recommendation with an informal tone), whereas an example 440 for tone 442, style 444, and/or length 446 includes a piece of writing to be used as an example when generating the recommendation (e.g., write a recommendation with the same tone as this example).

In some embodiments, prompt 114 includes examples 440. In some embodiments, examples 440 include the output of applying a high-capacity generative language model to an initial prompt as described with reference to FIG. 1. Examples can include tone examples 442, style examples 444, and/or length examples 446. For example, prompt 114 can include examples 440 with a desired tone causing the generative language model to output recommendation suggestions in the example tone (e.g., informal, professional, assertive, humorous, etc.). Similarly, style examples 444 include examples with a certain literary style such as expository, descriptive, persuasive, narrative, etc. Length examples 446 can also be used to ensure a minimum, ideal, or maximum length for a recommendation suggestion. In some embodiments, examples 440 are predetermined and stored in recommendation generation system 100, such as in data store 240. In some embodiments, examples 440 are generated by a machine learning model. For example, as described above, examples 440 are generated by a high-capacity generative language model.

Figure 5:
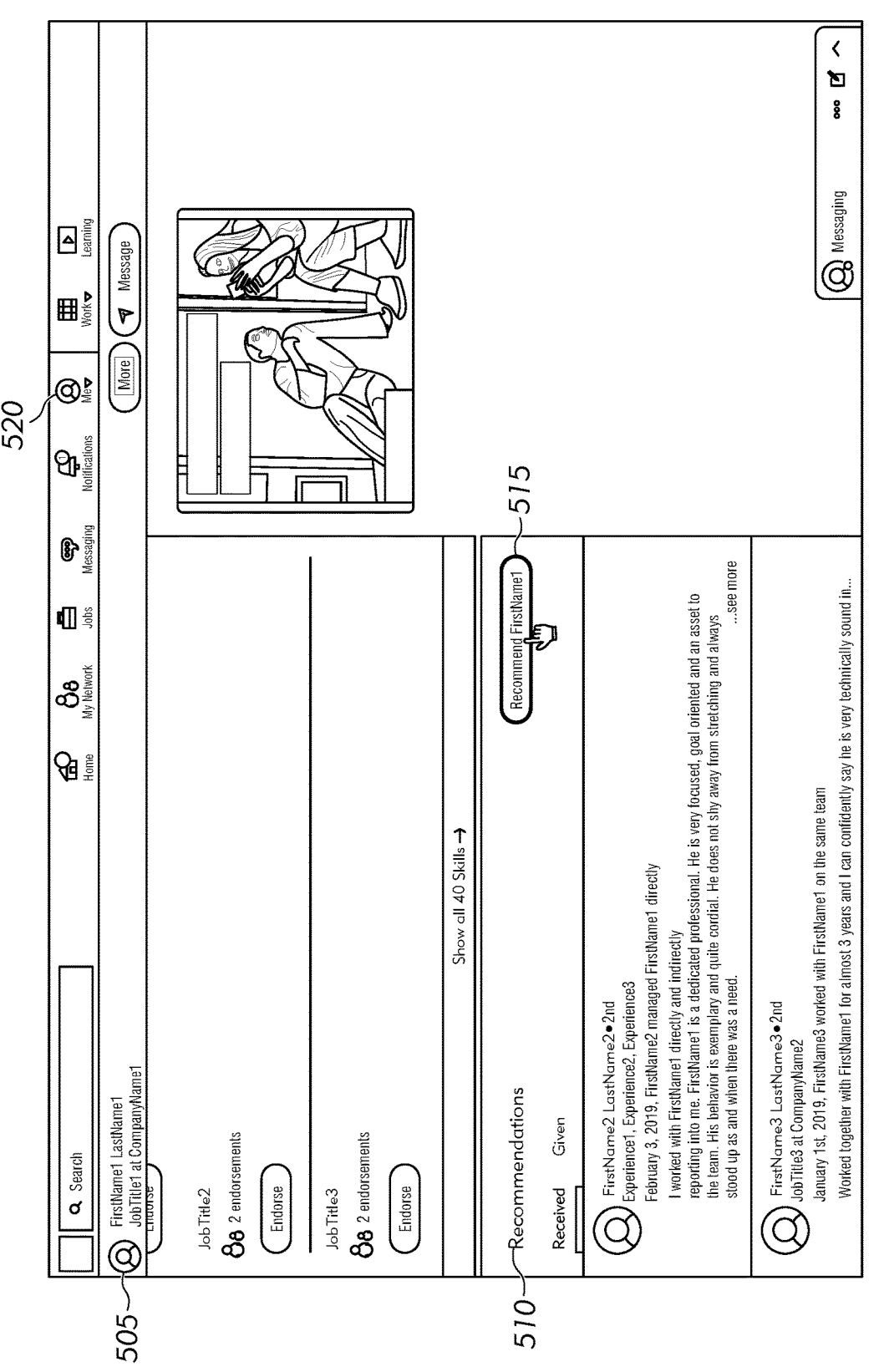
FIG. 5 illustrates an example graphical user interface in accordance with some embodiments of the present disclosure.

FIG. 5 illustrates an example graphical user interface 500 in accordance with some embodiments of the present disclosure. As shown in FIG. 5, graphical user interface 500 includes a profile 505, including a profile recommendations section 510. Profile recommendations section 510 includes recommend button 515. Profile recommendations section 510 is a widget located within graphical user interface 500 and profile 505 that includes a button 515 for entering a recommendation generation interface. In response to receiving a user input of a selection of button 515, graphical user interface 500 updates as shown in FIG. 6.

In some embodiments, graphical user interface 500 is implemented on a client device such as user interface 112 of user system 110. Profile 505 is a display associated with a profile such as profile 102 of FIG. 1. For example, profile 505 displays aspects of a user profile including user attribute data such as explicit attribute data 104 of FIG. 1. In some embodiments, the client device (e.g., user system 110) sends input to generative system for writing entity recommendations 105 including the user attribute data for the profile.

In some embodiments, as shown in FIG. 5, the user interacting with recommend button 515 is associated with a profile 520. In some embodiments, generative system for writing entity recommendations 105 uses attribute data associated with profile 520 as well as attribute data associated with profile 505. For example, generative system for writing entity recommendations 105 uses current and/or previous employer information for profile 520 to determine a shared employer with profile 505. The generative system for writing entity recommendations 105 then determines a job title for profile 505 for the shared employer. In some embodiments, the client device (e.g., user system 110) sends input to generative system for writing entity recommendations 105 including the attribute data for both profiles.

FIG. 6 illustrates the example graphical user interface 500 in accordance with some embodiments of the present disclosure. In response to a user selecting recommend button 515 of FIG. 5, graphical user interface updates to display recommendation interface 115. In some embodiments, as shown in FIG. 6, recommendation interface 115 is a floating interface positioned in front of profile 505 and recommendations section 510. As shown in FIG. 6, recommendation interface 115 includes user input sections 610, user input textbox 615, implicit attributes section 620, explicit attributes section 625, recommendation generation button 630, and recommendation submit button 635.

Figure 7:
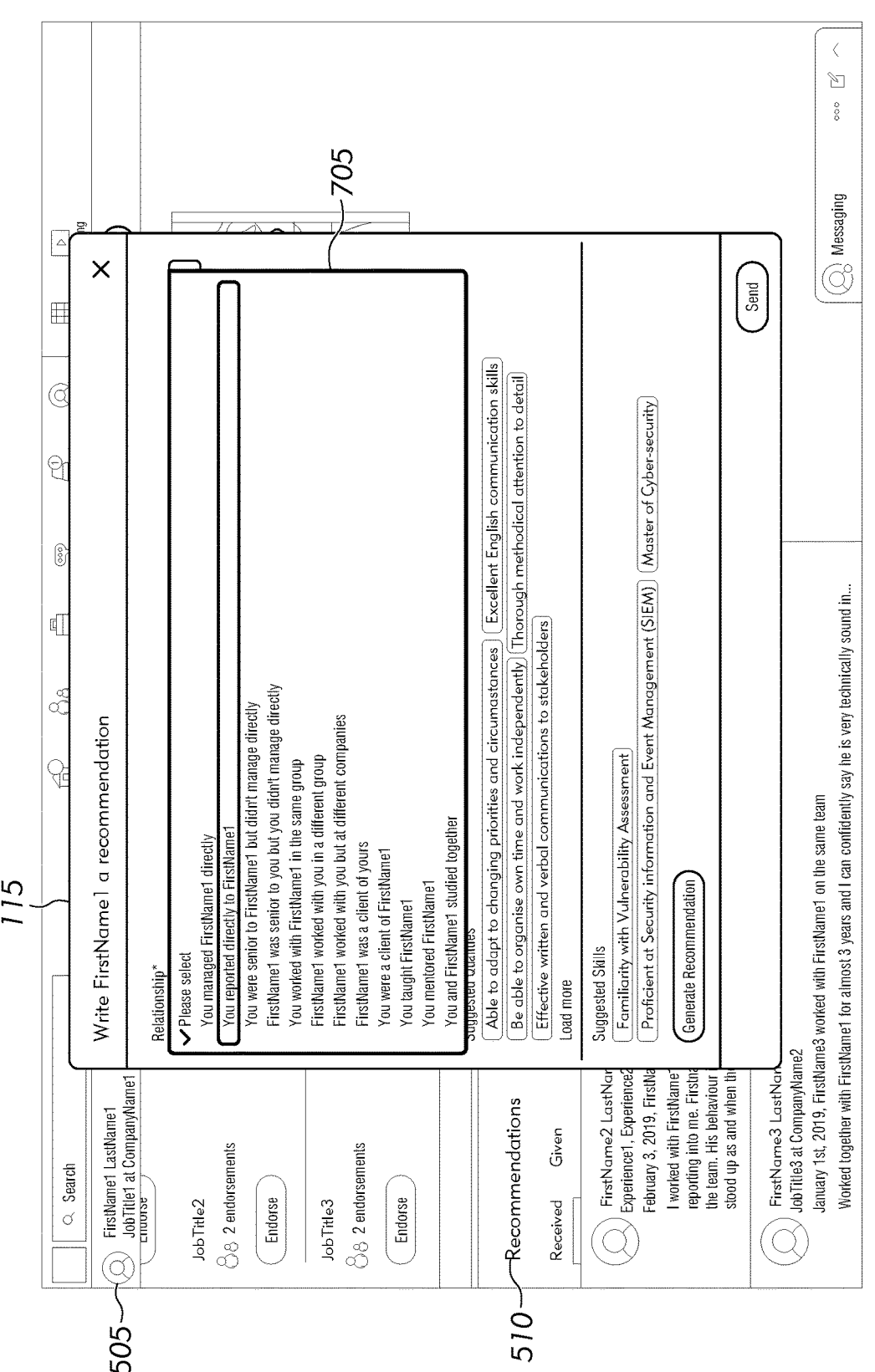
FIG. 7 illustrates the example graphical user interface in accordance with some embodiments of the present disclosure.
Figure 8:
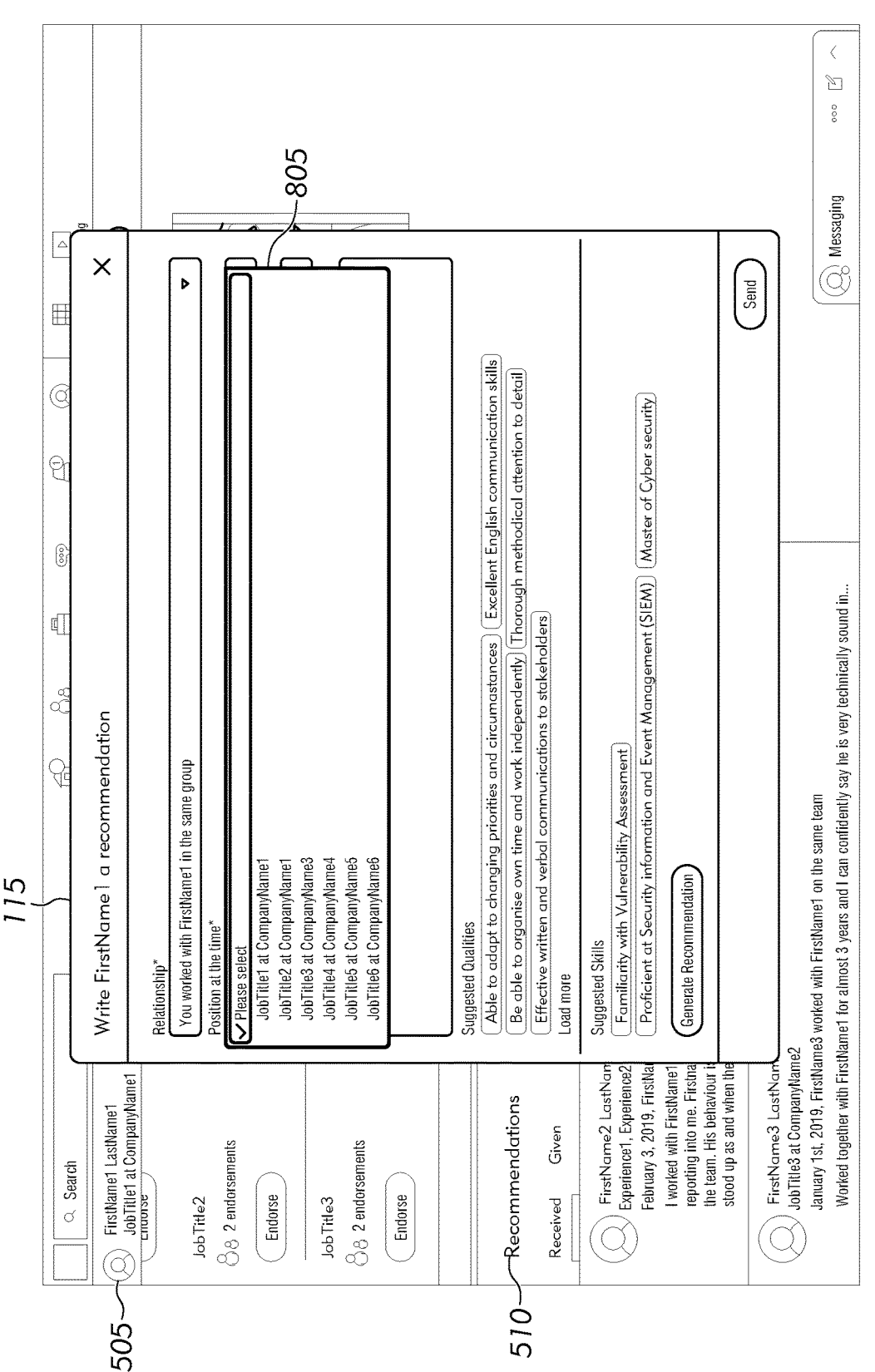
FIG. 8 illustrates the example graphical user interface in accordance with some embodiments of the present disclosure.
Figure 9:
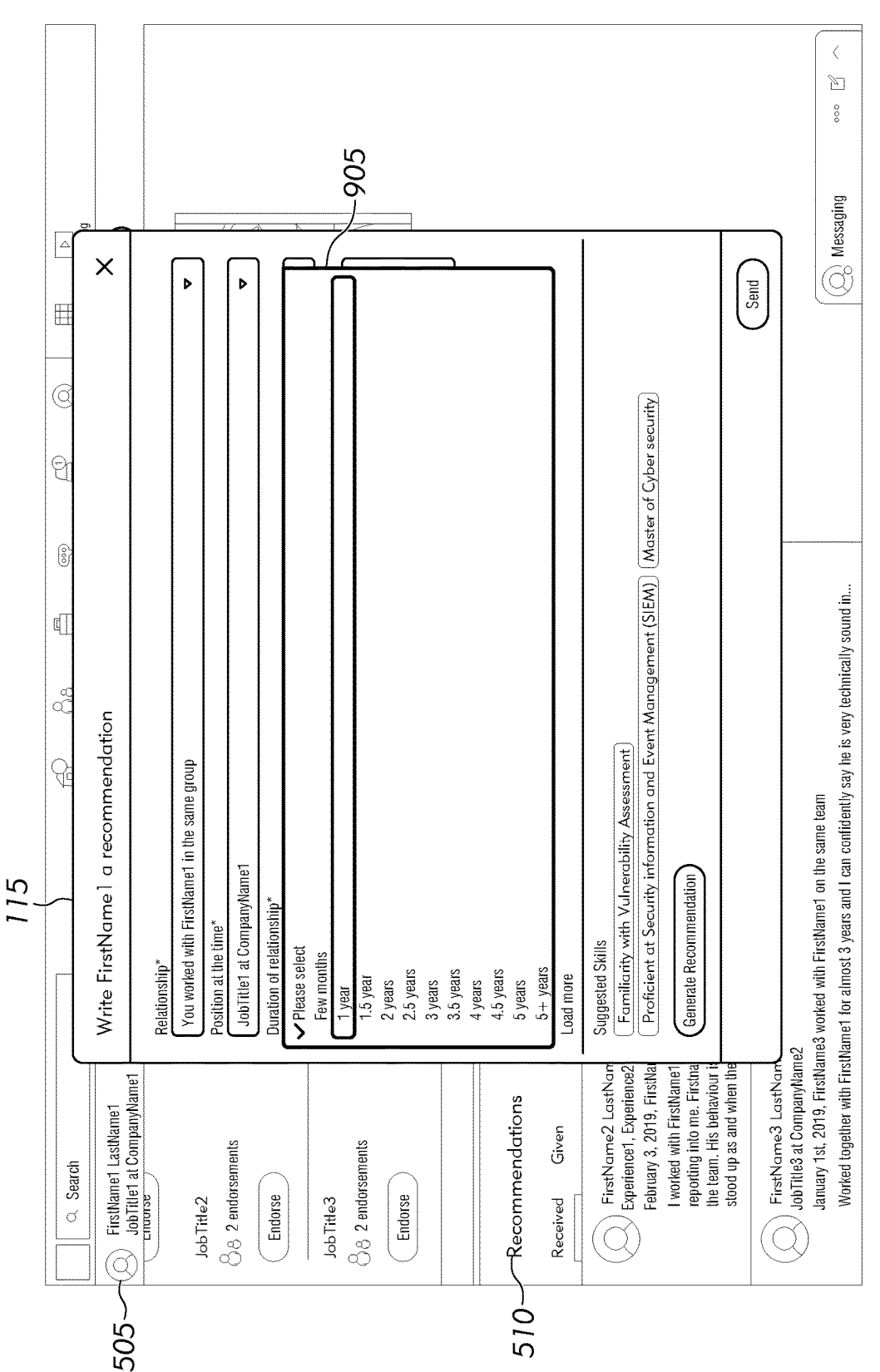
FIG. 9 illustrates the example graphical user interface in accordance with some embodiments of the present disclosure.

FIGS. 7-9 illustrate the example graphical user interface 500 in accordance with some embodiments of the present disclosure. In response to a user interacting with any of user input sections 610 of FIG. 6, graphical user interface 500 updates to include an input selections interface (such as input selections interface 705 of FIG. 7, input selections interface 805 of FIG. 8, and/or input selections interface 905 of FIG. 9). In some embodiments, input selections interfaces 705, 805, and 905 are floating interfaces positioned in front of recommendation interface 115. Input selections interfaces 705, 805, and 905 include selection options indicating attribute data for profile 505 and/or profile 520. As shown in FIGS. 7-9, in response to a user interaction with one of input selections interfaces 705, 805, and 905, graphical user interface 500 updates to show the selection. The generative system for writing entity recommendations 105 uses the user input received from the user interaction with input selections interfaces 705, 805, and 905 (e.g., user inputs 120 of FIG. 1) to generate prompt 114. For example, generative system for writing entity recommendations 105 uses the relationship, position, and duration of relationship to determine instructions 410 of FIG. 4 for prompt 114 to input into generative machine learning model 108.

In some embodiments, generative system for writing entity recommendations 105 uses the relationship, position, and duration of relationship to determine examples 440 including tone examples 442, style examples 444, and length examples 446. A recommendation for a recommended user who the recommender worked with for a short period of time in a more distant relationship may therefore be shorter and/or have a more formal tone than a recommendation for a recommended user who the recommender worked with for a longer period of time in a closer relationship.

In some embodiments, generative system for writing entity recommendations 105 automatically fills user input sections 610 upon displaying recommendation interface 115. For example, as mentioned above, generative system for writing entity recommendations 105 uses current and/or previous employer information for profile 520 to determine a shared employer with profile 505. The generative system for writing entity recommendations 105 then determines a job title for profile 505 for the shared employer (e.g., position). In some embodiments, the client device (e.g., user system 110) sends input to generative system for writing entity recommendations 105 including the attribute data for both profiles.

In some embodiments, generative system for writing entity recommendations 105 regenerates implicit attributes section 620 based on user input sections 610. For example, generative system for writing entity recommendations 105 receives a selection for one of user input sections 610 and updates the remaining user input sections 610 based on the received input.

Figure 10:
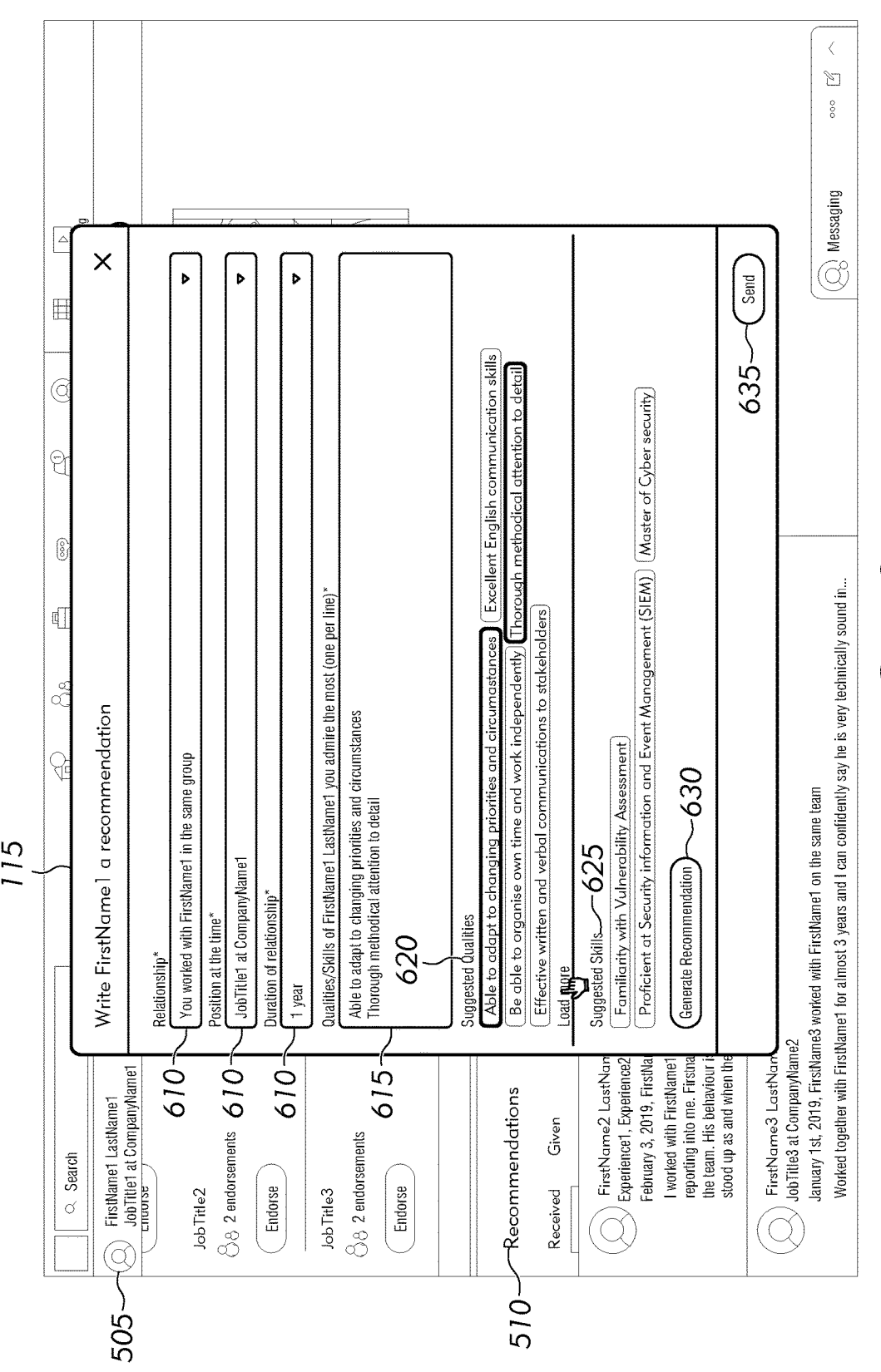
FIG. 10 illustrates the example graphical user interface in accordance with some embodiments of the present disclosure.

FIG. 10 illustrates the example graphical user interface 500 in accordance with some embodiments of the present disclosure. As shown in FIG. 10, in response to a user interaction with implicit attributes section 620, user input textbox 615 updates to include the implicit attribute selection. Implicit attributes section 620 includes implicit attribute suggestions 106 classified based on explicit attribute data 104. For example, as explained with reference to FIG. 1, recommendation generation system 100 determines implicit attribute suggestions 106 based on explicit attribute data 104 and classifies implicit attribute suggestions 106 as implicit. In some embodiments, generative system for writing entity recommendations 105 determines the implicit attribute suggestions 106 based on explicit attribute data 104. For example, generative system for writing entity recommendations 105 determines an implicit attribute suggestion for an ability to plan workload based on explicit attribute data 104 indicating the job title for profile 102.

Generative system for writing entity recommendations 105 sends implicit attribute suggestions 106 and explicit attribute suggestions 107 along with their classifications to user system 110 and user system 110 displays implicit attribute suggestions 106 and explicit attribute suggestions 107 on graphical user interface 500 based on their classification. For example, user system 110 displays implicit attribute suggestions 106 under implicit attributes section 620 and displays explicit attribute suggestions 107 under explicit attributes section 625. In some embodiments, as shown in FIG. 10, implicit attribute suggestions are referred to as qualities.

A user can interact with user input textbox 615 to add other implicit and/or explicit attributes. For example, a user can type into user input textbox 615 causing generative system for writing entity recommendations 105 to include the added user attribute into the prompt (e.g., prompt 114 of FIG. 1). In some embodiments, user system 110 receives the user interaction with user input textbox 615 and sends the added attributes as feedback (such as feedback 118 of FIG. 1) to generative system for writing entity recommendations 105. For example, in response to the user inputting "Able to adapt to changing priorities and circumstances" and "Thorough methodical attention to detail" to user input textbox 615, user system 110 sends the added attributes to generative system for writing entity recommendations 105 which uses the added attributes as training data to train implicit attribute generation component 150. In some embodiments, the added attributes are used as training data to train domain specific language model 310. For example, generative system for writing entity recommendations 105 receives the added attributes and generates training data using the added attributes and the job title (e.g., Sr. Engineer, Information Security) for the profile 102 to train domain specific language model 310 to generate the added attributes for profiles with the same job title. Generative system for writing entity recommendations 105 therefore learns the implicit and explicit attributes for job titles over time and can generate increasingly accurate suggestions for implicit attributes section 620 and explicit attributes section 625.

Figure 11:
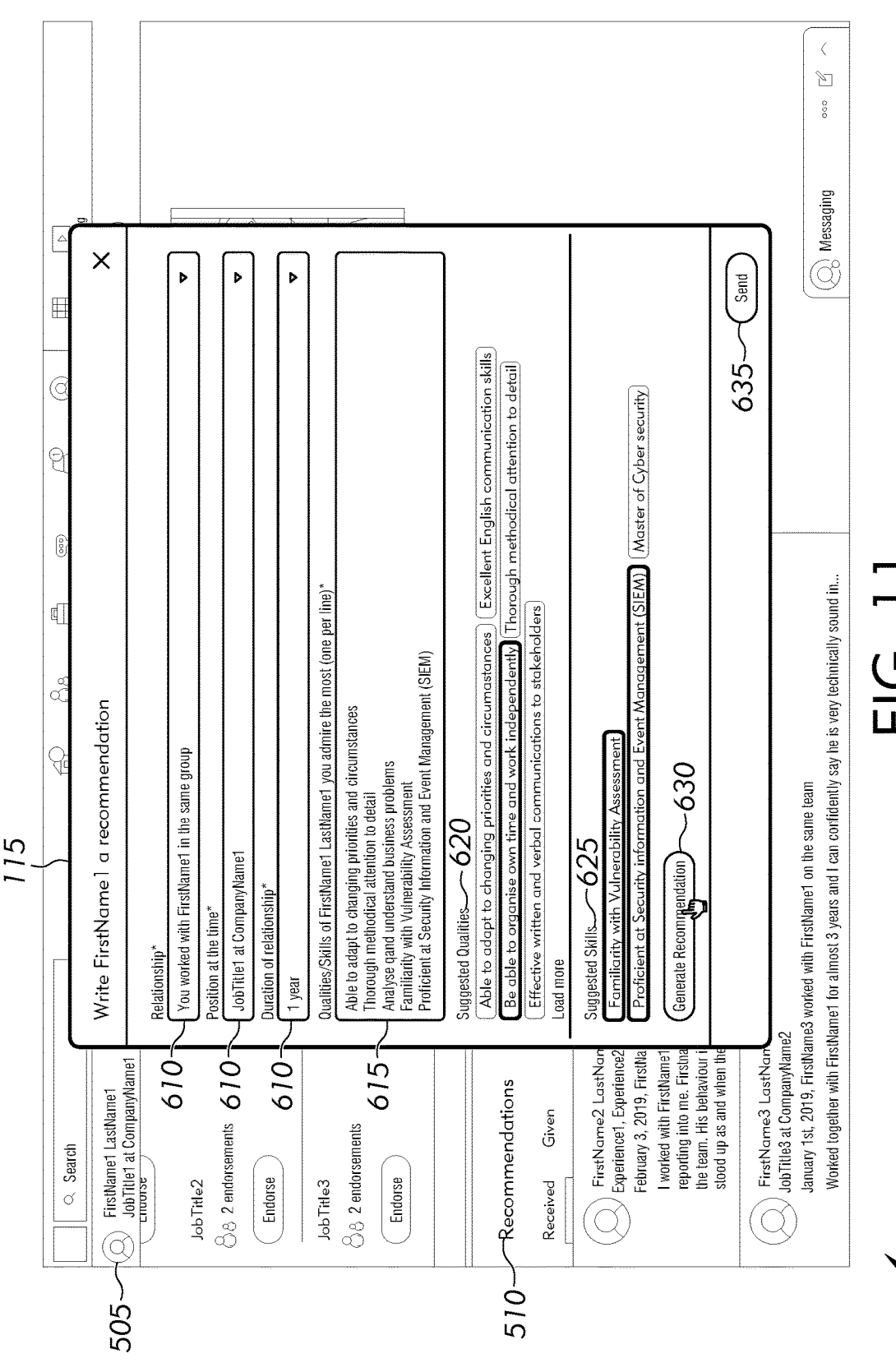
FIG. 11 illustrates the example graphical user interface in accordance with some embodiments of the present disclosure.

FIG. 11 illustrates the example graphical user interface 500 in accordance with some embodiments of the present disclosure. As shown in FIG. 11, in response to a user interaction with explicit attributes section 625, user input textbox 615 updates to include the explicit attribute selection. Explicit attributes section 625 includes explicit attribute suggestions 107 classified based on explicit attribute data 104. In some embodiments, as shown in FIG. 11, explicit attributes are referred to as skills.

In response to a user interaction with implicit attributes section 620, explicit attributes section 625, and/or user input textbox 615, user system 110 sends attribute selections 122 to generative system for writing entity recommendations 105 to generate prompt 114. For example, in response to a user selecting "analyze and understand business problems" from implicit attributes section 620, selecting "Familiarity with Vulnerability Assessment," and "Proficient at Security Information and Event Management (SIEM)" from explicit attributes section 625 and inputting "Able to adapt to changing priorities and circumstances" and "Thorough methodical attention to detail" into user input textbox 615, generative system for writing entity recommendations 105 generates prompt 114 using these attribute selections 122.

In some embodiments, as shown in FIG. 11, prompt generation component 160 generates adjectives to accompany the explicit attributes in explicit attributes section 625. For example, prompt generation component 160 generates qualifiers for a variety of different proficiency levels (e.g., familiar, proficient, and master) and uses them with the explicit attributes from profile 505. In some embodiments, the qualifiers are generated randomly. In other embodiments, the qualifiers are generated in response to information from profile 505. For example, qualifiers for higher proficiency levels are generated for a user with more recommendations for that particular explicit attribute. In some embodiments, the qualifiers can be regenerated by a user of graphical user interface 500. For example, a user of graphical user interface 500 can select a regenerate recommendation button (e.g., recommendation regeneration button 1210 of FIG. 12). In response to receiving a user interaction with recommendation regeneration button 1210, graphical user interface 500 updates to display new qualifiers for the explicit attributes in explicit attributes section 625.

In some embodiments, attribute selections 122 are used as prompt inputs 420 for prompt 114. For example, as explained with reference to FIG. 4, instructions 410 includes a template prompt for input into generative machine learning model 108 and prompt inputs 420 are used to fill in the gaps in the template prompt. The generative system for writing entity recommendations 105 therefore uses attribute selections 122 to fill in the gaps in instructions 410 to generate prompt 114. In some embodiments, user inputs are also used as prompt inputs 420 for prompt 114. For example, user inputs into user input sections 610 and/or user inputs into user input textbox 615 fill in gaps in instructions 410 to generate prompt 114. In response to a user interacting with recommendation generation button 630, graphical user interface 500 updates to display a recommendation suggestion (e.g., entity recommendation suggestion 116 of FIG. 1).

Figure 12:
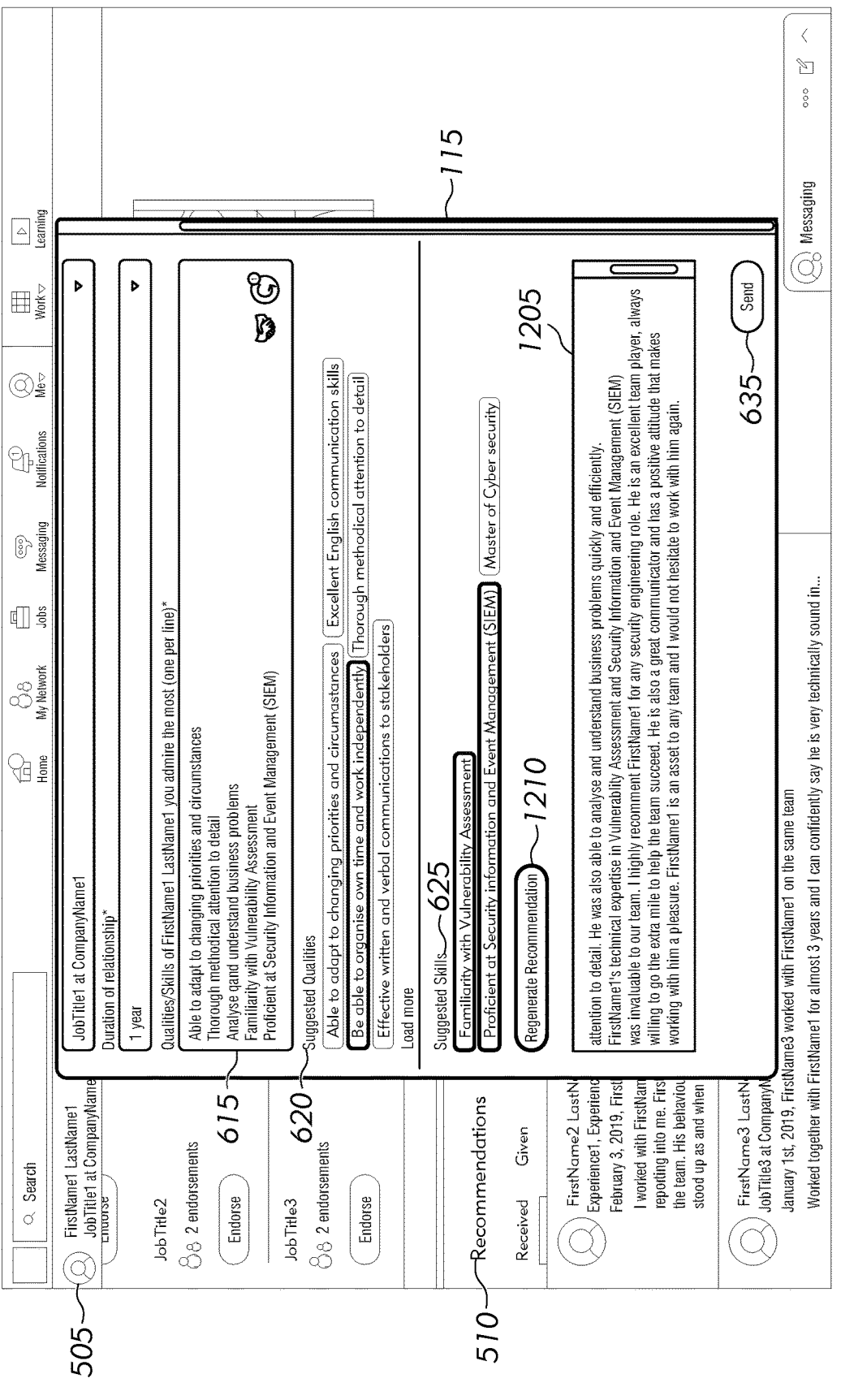
FIG. 12 illustrates the example graphical user interface in accordance with some embodiments of the present disclosure.

FIG. 12 illustrates the example graphical user interface 500 in accordance with some embodiments of the present disclosure. As shown in FIG. 12, in response to a user interaction with recommendation generation button 630, graphical user interface 500 updates to display recommendation suggestion section 1205. In some embodiments, as shown in FIG. 12, graphical user interface 500 updates to display recommendation regeneration button 1210 in place of recommendation generation button 630. In response to a user interaction with recommendation regeneration button 1210, graphical user interface 500 updates to display an updated recommendation suggestion section. In response to the user interaction with recommendation submit button 635, user system 110 sends user inputs 120, attribute selections 122, and/or feedback 118 to prompt generation component 160. In response to receiving user inputs 120, attribute selections 122, and/or feedback 118, prompt generation component 160 generates prompt 114. As explained with regards to FIG. 1, prompt generation component 160 sends prompt 114 to generative machine learning model 108. Generative machine learning model 108 generates entity recommendation suggestion 116 based on prompt 114 and sends entity recommendation suggestion 116 to user system 110. User system 110 receives entity recommendation suggestion 116 and displays entity recommendation suggestion 116 on user interface 112. For example, user system 110 updates recommendation interface 115 of graphical user interface 500 to display recommendation suggestion section 1205. In some embodiments, generative machine learning model 108 also sends entity recommendation suggestion 116 to prompt feedback component 168 of prompt generation component 160.

As shown in FIG. 12, recommendation suggestion section 1205 includes a text box for a user of user interface 112 to edit the text of recommendation suggestion section 1205. In some embodiments, in response to a user editing the text of recommendation suggestion section 1205, user system 110 sends feedback (e.g., feedback 118) to generative system for writing entity recommendations 105. In some embodiments, in response to receiving feedback 118, generative system for writing entity recommendations 105 updates generative machine learning model 108. For example, recommendation generation system 100 uses prompt 114 and feedback 118 as training data to train generative machine learning model 108. In some embodiments, in response to receiving feedback 118, generative system for writing entity recommendations 105 updates implicit attribute generation component 150. For example, generative system for writing entity recommendations 105 uses implicit attribute suggestions 106, explicit attribute suggestions 107 and feedback 118 as training data to train one or more of language model 305, domain specific language model 310, and classifier language model 315.

Figure 13:
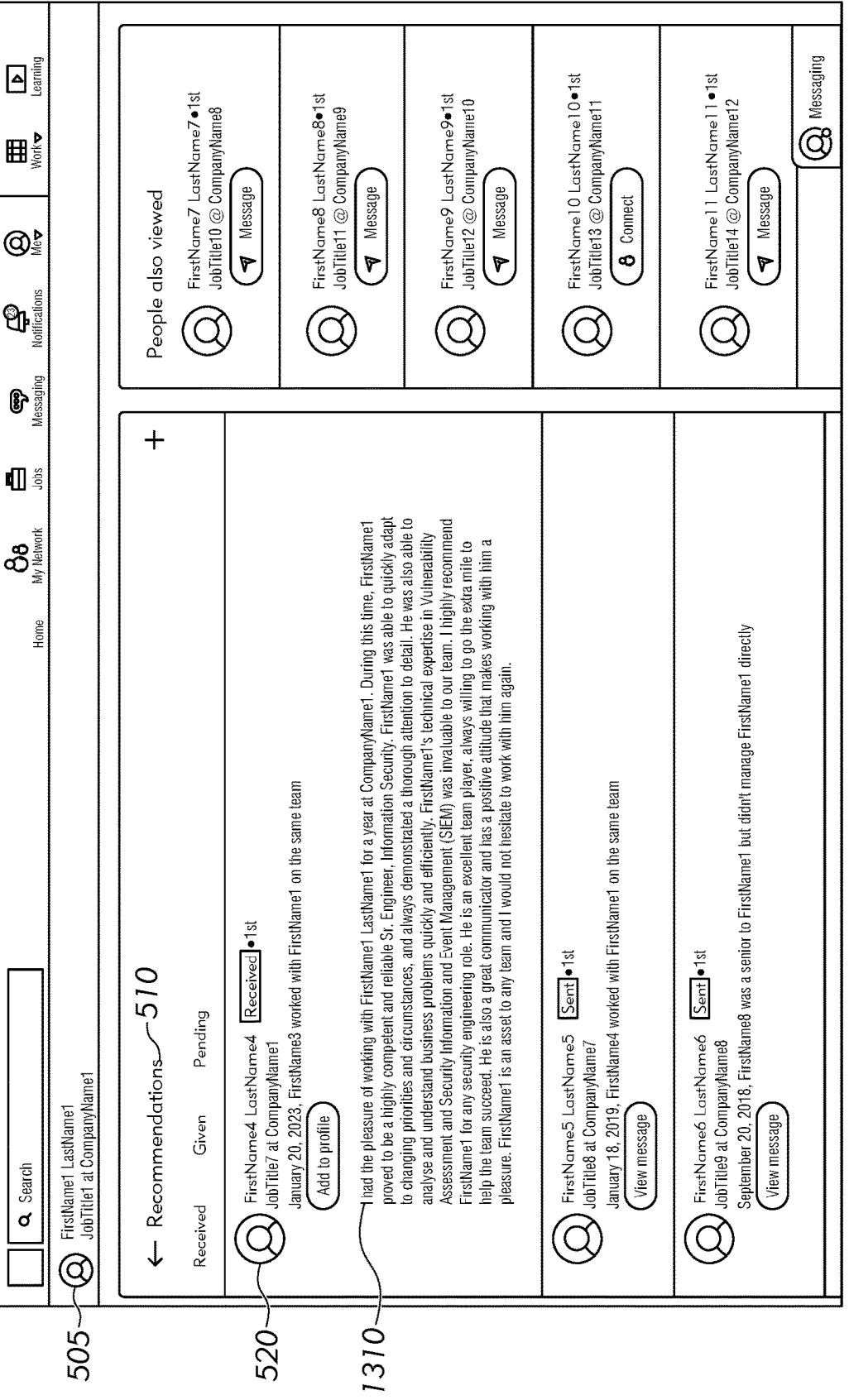
FIG. 13 illustrates the example graphical user interface in accordance with some embodiments of the present disclosure.

FIG. 13 illustrates the example graphical user interface 500 in accordance with some embodiments of the present disclosure. As shown in FIG. 13, in response to a user interaction with recommendation submit button 635, graphical user interface 500 updates and recommendation interface 115 closes. Profile recommendations section 510 of profile 505 updates to display recommendation submission 1310.

For example, profile 505 updates to display recommendation submission 1310 for recommender profile 520. Recommendation submission 1310 is based on entity recommendation suggestion (e.g., entity recommendation suggestion 116) and user interactions with recommendation suggestion section 1205. For example, graphical user interface 500 updates to display entity recommendation suggestion 116 with any edits made by the user via recommendation suggestion section 1205.

FIG. 14 is a flow diagram of an example method 1400 to generate recommendations in accordance with some embodiments of the present disclosure. The method 1400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1400 is performed by generative system for writing entity recommendations 105 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1405, the processing device receives input of a selection from a client device where the selection includes an explicit attribute. For example, generative system for writing entity recommendations 105 receives input from user system 110 to generate a recommendation (e.g., user interacting with recommend button 515) and generative system for writing entity recommendations 105 receives explicit attribute data 104 from the profile. In some embodiments, recommendation generation system 100 receives explicit attribute data 104 from the recommended user's profile (e.g., profile 505) as well as the recommender's profile (e.g., profile 520). Further details about receiving input of a selection from the client device are discussed with reference to FIGS. 1 and 5-13.

At operation 1410, the processing device generates implicit attribute suggestions based on the explicit attribute. For example, generative system for writing entity recommendations 105 applies a classifier language model (such as classifier language model 315 of FIG. 3) to the explicit attribute data 104 to generate implicit attribute suggestions 106 and/or explicit attribute suggestions 107 for the profile. In some embodiments, the classifier language model is trained through transfer learning to identify attributes based on a job title and classify the attributes as implicit or explicit. In some embodiments, implicit attribute generation component 150 generates implicit and explicit attributes using one or more of language model 305, domain specific language model 310, and classifier language model 315 based on the attribute data (e.g., a job title for the profile). Further details about generating implicit attribute suggestions are discussed with reference to FIGS. 1 and 3.

At operation 1415, the processing device sends the implicit attribute suggestions to the client device. For example, generative system for writing entity recommendations 105 sends attribute suggestions to the user device to be displayed on a graphical user interface (such as displaying implicit attribute suggestions 106 in implicit attributes section 620 and explicit attribute suggestions 107 in explicit attributes section 625 on graphical user interface 500). In some embodiments, generative system for writing entity recommendations 105 sends attribute suggestions to the client device based on user interaction with the graphical user interface (e.g., user inputs 120). For example, generative system for writing entity recommendations 105 sends different attribute suggestions based on the relationship between the recommended and recommender, the position of the recommended, and duration of relationship between the recommended and recommender. Further details about sending implicit attribute suggestions are discussed with reference to FIGS. 1 and 5-13.

At operation 1420, the processing device receives attribute selections including at least one implicit attribute selection from the client device. For example, a user of user interface 112 interacts with graphical user interface 500 as shown in FIGS. 10 and 11 to select attributes from the attributes displayed in implicit attributes section 620. In some embodiments, the user also selects attributes from explicit attributes section 625. In response to receiving the user interaction, user system 110 sends attribute selections 122 to prompt generation component 160. Further details about receiving attribute selections are discussed with reference to FIGS. 1 and 5-13.

At operation 1425, the processing device creates a prompt based on the received attribute selections. For example, prompt generation component 160 generates prompts with instructions and inputs based on attribute selections 122. In some embodiments, prompt generation component 160 generates the prompts based on user inputs 120. Further details with regards to creating a prompt based on the received attribute selections are discussed with reference to FIGS. 1 and 4.

At operation 1430, the processing device applies a generative language model to the prompt. For example, prompt generation component 160 sends prompt 114 to generative machine learning model 108 to generate a recommendation suggestion (e.g., entity recommendation suggestion 116 of FIG. 1) based on prompt 114. Further details about applying a generative language model to the prompt are discussed with reference to FIG. 1.

At operation 1435, the processing device outputs, by the generative language model, based on the prompt, content including a suggested user recommendation, where the suggested user recommendation is capable of being added to a user profile. For example, generative machine learning model 108 generates entity recommendation suggestion 116 based on prompt 114 and sends entity recommendation suggestion 116 to user system 110. In some embodiments, generative machine learning model 108 sends entity recommendation suggestion 116 to prompt feedback component 168 for review before sending to user system 110. User system 110 receives entity recommendation suggestion 116 and displays entity recommendation suggestion 116 on recommendation interface 115. Upon a user interaction with the displayed entity recommendation suggestion 116, generative system for writing entity recommendations 105 can cause entity recommendation suggestion 116 to be added to the recommended user's profile. For example, in response to receiving a user interaction with recommendation submit button 635, generative system for writing entity recommendations 105 adds recommendation submission 1310 to profile 102. Further details about outputting the suggested user recommendation are discussed with reference to FIGS. 1 and 6-13.

Figure 15:
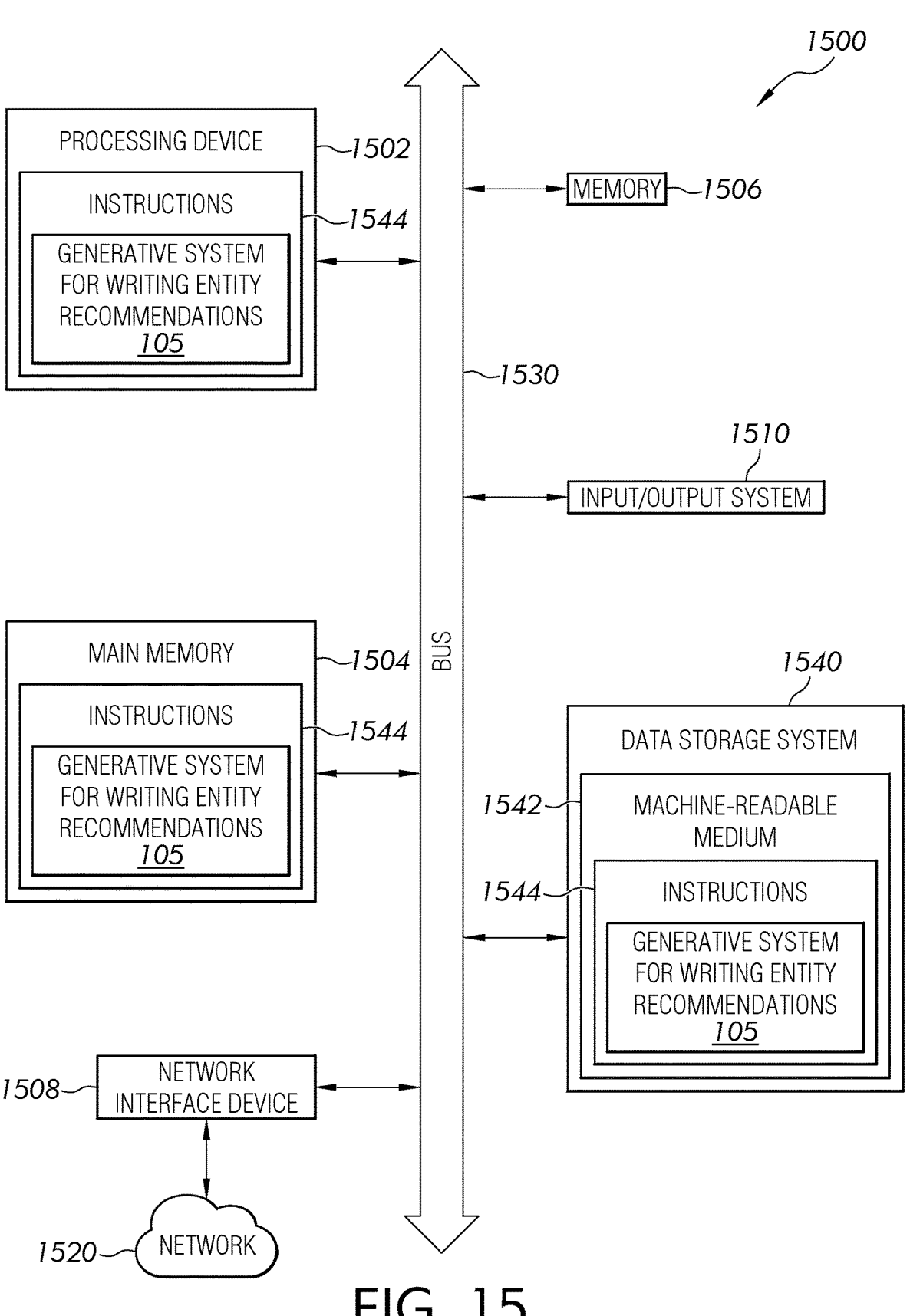
FIG. 15 is a block diagram of an example computer system in which embodiments of the present disclosure can operate.

FIG. 15 illustrates an example machine of a computer system 1500 within which a set of instructions, for causing the machine to perform any one or more of the methodogies discussed herein, can be executed. In some embodiments, the computer system 1500 can correspond to a component of a networked computer system (e.g., the recommendation generation system 100 of FIG. 1) that includes, is coupled to, or utilizes a machine to execute an operating system to perform operations corresponding to implicit attribute generation component 150 and/or prompt generation component 160 of FIG. 1. The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1500 includes a processing device 1502, a main memory 1504 (e.g., read-only memory (ROM), flash memory, dynamic random-access memory (DRAM) such as synchronous DRAM (SDRAM) or Rambus DRAM (RDRAM), etc.), a memory 1506 (e.g., flash memory, static random-access memory (SRAM), etc.), an input/output system 1510, and a data storage system 1540, which communicate with each other via a bus 1530.

Processing device 1502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1502 can also be one or more special-purpose processing devices such as an application specific integrated circuit (ASIC), a field programmable gate array (FPGA), a digital signal processor (DSP), network processor, or the like. The processing device 1502 is configured to execute instructions 1544 for performing the operations and steps discussed herein.

The computer system 1500 can further include a network interface device 1508 to communicate over the network 1520. Network interface device 1508 can provide a two-way data communication coupling to a network. For example, network interface device 1508 can be an integrated-services digital network (ISDN) card, cable modem, satellite modem, or a modem to provide a data communication connection to a corresponding type of telephone line. As another example, network interface device 1508 can be a local area network (LAN) card to provide a data communication connection to a compatible LAN. Wireless links can also be implemented. In any such implementation network interface device 1508 can send and receive electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 1500.

Computer system 1500 can send messages and receive data, including program code, through the network(s) and network interface device 1508. In the Internet example, a server can transmit a requested code for an application program through the Internet and network interface device 1508. The received code can be executed by processing device 1502 as it is received, and/or stored in data storage system 1540, or other non-volatile storage for later execution.

The input/output system 1510 can include an output device, such as a display, for example a liquid crystal display (LCD) or a touchscreen display, for displaying information to a computer user, or a speaker, a haptic device, or another form of output device. The input/output system 1510 can include an input device, for example, alphanumeric keys and other keys configured for communicating information and command selections to processing device 1502. An input device can, alternatively or in addition, include a cursor control, such as a mouse, a trackball, or cursor direction keys for communicating direction information and command selections to processing device 1502 and for controlling cursor movement on a display. An input device can, alternatively or in addition, include a microphone, a sensor, or an array of sensors, for communicating sensed information to processing device 1502. Sensed information can include voice commands, audio signals, geographic location information, and/or digital imagery, for example.

The data storage system 1540 can include a machine-readable storage medium 1542 (also known as a computer-readable medium) on which is stored one or more sets of instructions 1544 or software embodying any one or more of the methodologies or functions described herein. The instructions 1544 can also reside, completely or at least partially, within the main memory 1504 and/or within the processing device 1502 during execution thereof by the computer system 1500, the main memory 1504 and the processing device 1502 also constituting machine-readable storage media.

In one embodiment, the instructions 1544 include instructions to implement functionality corresponding to an implicit attribute generation component and a prompt generation component (e.g., implicit attribute generation component 150 and prompt generation component 160 of FIG. 1). While the machine-readable storage medium 1542 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the recommendation generation system 100, can carry out the computer-implemented method 1400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs (erasable programmable ROM), EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

An example 1 includes a method including: receiving an input of a selection from a client device, where the client device provides (i) a graphical user interface associated with a first user profile and (ii) a recommendation interface, where the selection includes at least one explicit attribute included in the first user profile; generating one or more implicit attribute suggestions based on the at least one explicit attribute; sending the one or more implicit attribute suggestions to the client device to cause the one or more implicit attribute suggestions to be presented on the recommendation interface; receiving one or more attribute selections including at least one implicit attribute suggestion from the client device, where the one or more attribute selections are generated by an interaction with the one or more implicit attribute suggestions; creating one or more prompts based on the one or more received attribute selections; applying a generative language model to the one or more prompts; and outputting, by the generative language model, based on the one or more prompts, content including a suggested user recommendation for the first user profile, where the suggested user recommendation is capable of being added to the first user profile.

An example 2 includes the subject matter of example 1, further including: generating one or more explicit attribute suggestions based on the at least one explicit attribute; and sending the one or more explicit attribute suggestions to the client device to cause the one or more explicit attribute suggestions to be presented on the recommendation interface, where the one or more received attribute selections are further generated by an interaction with the one or more explicit attribute suggestions. An example 3 includes the subject matter of example 2, further including: generating a qualifier for each of the one or more explicit attribute suggestions; and sending the qualifier with the one or more explicit attribute suggestions to the client device. An example 4 includes the subject matter of any of examples 1-3, where generating one or more implicit attribute suggestions includes: applying a language model to the at least one explicit attribute, where the language model outputs the one or more implicit attribute suggestions. An example 5 includes the subject matter of example 4, further including: classifying, by the language model, the one or more implicit attribute suggestions as implicit. An example 6 includes the subject matter of any of examples 1-5, where generating one or more implicit attribute suggestions includes: filtering out attribute suggestions of the one or more implicit attribute suggestions based on similarity between attribute suggestions. An example 7 includes the subject matter of any of examples 1-6, further including: receiving feedback from the client device; creating one or more updated prompts based on one or more received attribute selections and the feedback; applying the generative language model to the one or more updated prompts; outputting, by the generative language model, based on the one or more updated prompts, an updated suggested user recommendation; and sending the updated suggested user recommendation to the client device. An example 8 includes the subject matter of any of examples 1-7, further including: receiving a recommendation submission from the client device; and sending the suggested user recommendation output by the generative language model to the client device to cause the suggested user recommendation to be presented on the recommendation interface in response to receiving the recommendation submission. An example 9 includes the subject matter of any of examples 1-8, further including: receiving user input from the client device, where creating the one or more prompts is further based on the user input. An example 10 includes the subject matter of any of examples 1-9, further including: determining a second user profile, where the second user profile is associated with a user of the graphical user interface, where creating the one or more prompts is further based on the first user profile and the second user profile.

An example 11 includes a system including: at least one memory device; and a processing device, operatively coupled with the at least one memory device, to: receive an input of a selection from a client device, where the client device provides (i) a graphical user interface associated with a first user profile and (ii) a recommendation interface, where the selection includes at least one explicit attribute included in the first user profile; generate one or more implicit attribute suggestions based on the at least one explicit attribute; send the one or more implicit attribute suggestions to the client device to cause the one or more implicit attribute suggestions to be presented on the recommendation interface; receive one or more attribute selections including at least one implicit attribute suggestion from the client device, where the one or more attribute selections are generated by an interaction with the one or more implicit attribute suggestions; create one or more prompts based on the one or more received attribute selections; apply a generative language model to the one or more prompts; and output, by the generative language model, based on the one or more prompts, content including a suggested user recommendation for the first user profile, where the suggested user recommendation is capable of being added to the first user profile.

An example 12 includes the subject matter of example 11, where the processing device is further to: generate one or more explicit attribute suggestions based on the at least one explicit attribute; and send the one or more explicit attribute suggestions to the client device to cause the one or more explicit attribute suggestions to be presented on the recommendation interface, where the one or more received attribute selections are further generated by an interaction with the one or more explicit attribute suggestions. An example 13 includes the subject matter of example 12, where the processing device is further to: generate a qualifier for each of the one or more explicit attribute suggestions; and send the qualifier with the one or more explicit attribute suggestions to the client device. An example 14 includes the subject matter of any of examples 11-13, where generating one or more implicit attribute suggestions includes: applying a language model to the at least one explicit attribute, where the language model outputs the one or more implicit attribute suggestions. An example 15 includes the subject matter of example 14, where the processing device is further to: classify, by the language model, the one or more implicit attribute suggestions as implicit. An example 16 includes the subject matter of any of examples 11-15, where generating one or more implicit attribute suggestions includes: filtering out attribute suggestions of the one or more implicit attribute suggestions based on similarity between attribute suggestions. An example 17 includes the subject matter of any of examples 11-16, where the processing device is further to: receive feedback from the client device; create one or more updated prompts based on one or more received attribute selections and the feedback; apply the generative language model to the one or more updated prompts; output, by the generative language model, based on the one or more updated prompts, an updated suggested user recommendation; and send the updated suggested user recommendation to the client device. An example 18 includes the subject matter of any of examples 11-17, where the processing device is further to: receive a recommendation submission from the client device; and send the suggested user recommendation output by the generative language model to the client device to cause the suggested user recommendation to be presented on the recommendation interface in response to receiving the recommendation submission. An example 19 includes the subject matter of any of examples 11-18, where the processing device is further to: receive user input from the client device, where creating the one or more prompts is further based on the user input. An example 20 includes the subject matter of any of examples 11-19, where the processing device is further to: determine a second user profile, where the second user profile is associated with a user of the graphical user interface, where creating the one or more prompts is further based on the first user profile and the second user profile.

An example 21 includes at least one non-transitory machine-readable storage medium, including instructions that, when executed by at least one processing device, cause the at least one processing device to perform at least one operation including the method of any of examples 1-10.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A method for aiding a second user to write a recommendation for a first user, comprising:

receiving, from a client device, an input comprising a selection of the second user, wherein the client device provides (i) a graphical user interface associated with the first user of a first user profile, presented to the second user and (ii) a recommendation interface presented to the second user, and the selection of the second user comprises at least one selected explicit attribute corresponding to the first user and included in the first user profile;

generating one or more implicit attribute suggestions corresponding to the first user, based on the at least one selected explicit attribute;

sending the one or more implicit attribute suggestions to the client device to be presented to the second user on the recommendation interface;

receiving, from the client device, one or more attribute selections comprising at least one implicit attribute suggestion corresponding to the first user, wherein the one or more attribute selections are generated by an interaction with the second user about the first user, at the recommendation interface, with the one or more implicit attribute suggestions;

creating one or more prompts based on the one or more received attribute selections;

applying a generative language model to the one or more prompts; and outputting, by the generative language model, based on the one or more prompts, content comprising a suggested user recommendation for the first user profile, wherein the suggested user recommendation is based on the interaction with the second user and is capable of being added to the first user profile.

2. The method of claim 1, further comprising:

generating one or more explicit attribute suggestions based on the at least one explicit attribute; and sending the one or more explicit attribute suggestions to the client device to be presented on the recommendation interface, wherein the one or more received attribute selections are further generated by an interaction, at the recommendation interface, with the one or more explicit attribute suggestions.

3. The method of claim 2, further comprising:

generating a qualifier for each of the one or more explicit attribute suggestions; and sending, to the client device, the qualifier with the one or more explicit attribute suggestions.

4. The method of claim 1, wherein generating one or more implicit attribute suggestions comprises:

applying a language model to the at least one explicit attribute, wherein the language model outputs the one or more implicit attribute suggestions.

5. The method of claim 4, further comprising:

classifying, by the language model, the one or more implicit attribute suggestions as implicit.

6. The method of claim 1, wherein generating one or more implicit attribute suggestions comprises:

filtering out attribute suggestions of the one or more implicit attribute suggestions based on similarity between attribute suggestions.

7. The method of claim 1, further comprising:

receiving, from the client device, feedback;

creating one or more updated prompts based on one or more received attribute selections and the feedback;

applying the generative language model to the one or more updated prompts;

outputting, by the generative language model, based on the one or more updated prompts, an updated suggested user recommendation; and sending, to the client device, the updated suggested user recommendation.

8. The method of claim 1, further comprising:

receiving, from the client device, a recommendation submission; and sending the suggested user recommendation output by the generative language model to the client device to be presented on the recommendation interface in response to receiving the recommendation submission.

9. The method of claim 1, further comprising:

receiving, from the client device, user input, wherein creating the one or more prompts is further based on the user input.

10. The method of claim 1, further comprising:

determining a second user profile, wherein the second user profile is associated with the second user of the graphical user interface, wherein creating the one or more prompts is further based on the first user profile and the second user profile.

11. A system for aiding a second user to write a recommendation for a first user comprising:

at least one memory device; and a processing device, operatively coupled with the at least one Memory device, to:

receive, from a client device, an input comprising a selection of the second user, wherein the client device provides (i) a graphical user interface associated with the first user of a first user profile, presented to the second user and (ii) a recommendation interface presented to the second user, and the selection of the second user comprises at least one selected explicit attribute corresponding to the first user and included in the first user profile;

generate one or more implicit attribute suggestions corresponding to the first user based on the at least one selected explicit attribute;

send the one or more implicit attribute suggestions to the client device to be presented to the second user on the recommendation interface;

receive, from the client device, one or more attribute selections comprising at least one implicit attribute suggestion corresponding to the first user, wherein the one or more attribute selections are generated by an interaction with the second user about the first user, at the recommendation interface, with the one or more implicit attribute suggestions;

create one or more prompts based on the one or more received attribute selections;

apply a generative language model to the one or more prompts; and output, by the generative language model, based on the one or more prompts, content comprising a suggested user recommendation for the first user profile, wherein the suggested user recommendation is based on the interaction with the second user and is capable of being added to the first user profile.

12. The system of claim 11, wherein the processing device is further to:

generate one or more explicit attribute suggestions based on the at least one explicit attribute; and send the one or more explicit attribute suggestions to the client device to be presented on the recommendation interface, wherein the one or more received attribute selections are further generated by an interaction, at the recommendation interface, with the one or more explicit attribute suggestions.

13. The system of claim 12, wherein the processing device is further to:

generate a qualifier for each of the one or more explicit attribute suggestions; and send, to the client device, the qualifier with the one or more explicit attribute suggestions.

14. The system of claim 11, wherein generating one or more implicit attribute suggestions comprises:

applying a language model to the at least one explicit attribute, wherein the language model outputs the one or more implicit attribute suggestions.

15. The system of claim 14, wherein the processing device is further to:

classify, by the language model, the one or more implicit attribute suggestions as implicit.

16. The system of claim 11, wherein generating one or more implicit attribute suggestions comprises:

filtering out attribute suggestions of the one or more implicit attribute suggestions based on similarity between attribute suggestions.

17. A non-transitory computer-readable storage medium for aiding a second user to write a recommendation for a first user comprising instructions that, when executed by a processing device, cause the processing device to:

receive, from a client device, an input comprising a selection of the second user, wherein the client device provides (i) a graphical user interface associated with the first user of a first user profile, presented to the second user and (ii) a recommendation interface presented to the second user, and the selection of the second user comprises at least one explicit attribute corresponding to the first user included in the first user profile;

generate one or more implicit attribute suggestions corresponding to the first user based on the at least one explicit attribute;

send the one or more implicit attribute suggestions to the client device to be presented to the second user on the recommendation interface;

receive, from the client device, one or more attribute selections comprising at least one implicit attribute suggestion corresponding to the first user, wherein the one or more attribute selections are generated by an interaction with the second user, at the recommendation interface, with the one or more implicit attribute suggestions;

create one or more prompts based on the one or more received attribute selections;

apply a generative language model to the one or more prompts; and output, by the generative language model, based on the one or more prompts, content comprising a suggested user recommendation for the first user profile, wherein the suggested user recommendation is based on the interaction with the second user, at the recommendation interface, with the one or more implicit attribute suggestions and is capable of being added to the first user profile.

18. The non-transitory computer-readable storage medium of claim 17, wherein the processing device is further to:

generate one or more explicit attribute suggestions based on the at least one explicit attribute; and send the one or more explicit attribute suggestions to the client device to be presented on the recommendation interface, wherein the one or more received attribute selections are further generated by an interaction, at the recommendation interface, with the one or more explicit attribute suggestions.

19. The non-transitory computer-readable storage medium of claim 18, wherein the processing device is further to:

generate a qualifier for each of the one or more explicit attribute suggestions; and send, to the client device, the qualifier with the one or more explicit attribute suggestions.

20. The non-transitory computer-readable storage medium of claim 17, wherein generating one or more implicit attribute suggestions comprises:

applying a language model to the at least one explicit attribute, wherein the language model outputs the one or more implicit attribute suggestions.

* * * * *